US011494982B2

(12) United States Patent
Makem et al.

(10) Patent No.: US 11,494,982 B2
(45) Date of Patent: Nov. 8, 2022

(54) FEATURE BASED ABSTRACTION AND MESHING

(71) Applicant: Siemens Industry Software Inc., Plano, TX (US)

(72) Inventors: Jonathan Makem, Cambridge (GB); Nilanjan Mukherjee, Cincinnati, OH (US); Debashis Basu, Cincinnati, OH (US); Abinesh Thota, Mainville, OH (US); Harold Fogg, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 30 days.

(21) Appl. No.: 17/270,615

(22) PCT Filed: Sep. 21, 2018

(86) PCT No.: PCT/US2018/052107
§ 371 (c)(1),
(2) Date: Feb. 23, 2021

(87) PCT Pub. No.: WO2020/060560
PCT Pub. Date: Mar. 26, 2020

(65) Prior Publication Data
US 2021/0335042 A1 Oct. 28, 2021

(51) Int. Cl.
*G06T 17/20* (2006.01)
*G06V 40/16* (2022.01)
(52) U.S. Cl.
CPC .......... *G06T 17/205* (2013.01); *G06V 40/167* (2022.01)
(58) Field of Classification Search
CPC .. G06T 17/205; G06V 40/167; G06V 40/169; G06V 40/173; G06V 20/653; G06V 2201/07
See application file for complete search history.

(56) References Cited

U.S. PATENT DOCUMENTS 8,970,590 B1    3/2015   Brennan et al.
9,830,744 B1 *  11/2017  Kanthasamy ........... G06T 17/10
(Continued)

FOREIGN PATENT DOCUMENTS

EP   1141899 A1    10/2001
JP   2007233560    9/2007
JP   2007241996    9/2007

OTHER PUBLICATIONS

Brett W. Clark (Ed.), Proceedings of the 18th International Meshing Roundtable, Springer, pp. 651 (Year: 2018).*
(Continued)

*Primary Examiner* — Phuc N Doan

(57) ABSTRACT

Methods for CAD operations and corresponding systems (2800) and computer-readable mediums (2826) are disclosed herein. A method includes receiving (502) a model (600) of a part to be manufactured, wherein the model includes a plurality of original faces (102, 104, 106, 112, 114). The method includes classifying (510) each face in model according to a relative face curvature according to classifications that include at least a high-curvature classification (702). The method includes classifying (514) any sliver faces (102, 104, 106, 112, 114) and narrow blend faces (402, 404, 406, 408) of the plurality of faces. The method includes merging (516) contiguous faces (702) in each classification. The method includes detecting (518) special faces (1002, 1012) of the plurality of faces. The method includes restoring (520) original faces in the high-curvature classification except for the special faces (1002, 1012). The method includes processing (522) shared edges of the restored original faces to produce merged faces (802). The method includes merging together (524) any merged faces
(Continued)

that produce a locally narrow face (302) or an isthmus (202). The method includes storing (526) a modified model of the part to be manufactured.

19 Claims, 28 Drawing Sheets

(56) References Cited

U.S. PATENT DOCUMENTS

| | | |
|---|---|---|
| 2004/0119711 A1 | 6/2004 | Wollny et al. |
| 2017/0046874 A1* | 2/2017 | Mason ................. G06T 17/205 |
| 2017/0061037 A1* | 3/2017 | Makem ................. G06T 17/20 |

OTHER PUBLICATIONS

Thakur A. et al., A Survey of CAD Model Simplification Techniques for Physics-Based Simulation Applications, Elsevier, Computer-Aided Design, vol. 41, No. 2, Feb. 1, 2009, pp. 65-80.

William Roshan Quadros et al., "Defeaturing CAD Models using a Geometry-Based Size Field and Facet-Based Reduction Operators", Engineering with Computers, An International Journal, Journal for Simulation-based Engineering, Springer-Verlag, LO, vol. 28, No. 3, Feb. 2, 2012, pp. 211-224.

Jonathan Makem et al., "Automatic Decomposition and Efficient Semi-Structured Meshing of Complex Solids", Engineering with Computers, vol. 30, No. 3, Dec. 5, 2012, pp. 345-361.

Wang D. et al., "An Analysis and Comparison of Parameterization-Based Computation of Differential Quantities for Discrete Surfaces", Computer Aided Geometric Design, North-Holland, Amsterdam, NL, vol. 26, No. 5, Jun. 1, 2009, pp. 510-527.

Gabriel Taubin, "Estimating the Tensor of Curvature of a Surface from a Polyhedral Approximation", Computer Vision, 1995 Proceedings, Fifth International Conference, Cambridge, MA, USA, Jun. 20-23, 1995, Los Alamitos, CA, USA, IEEE Comput. Society, US, Jun. 20, 1995, pp. 902-907.

Nilanjan Mukherjee, "CSALF-Q: A Bricolage Algorithm for Anisotropic Quad Mesh Generation", Proc. XXth International Meshing Roundtable, Paris, France, Springer, 2011, Jan. 1, 2011, pp. 489-510.

Jean Cabello, "Toward Quality Surface Meshing", Proc. XIIth International Meshing Roundtable, Santa Fe, New Mexico, Jan. 1, 2003, pp. 201-213.

PCT International Search Report and Written Opinion of International Searching Authority dated Apr. 18, 2019 corresponding to PCT International Application No. PCT/US2018/052107 filed Sep. 21, 2018.

* cited by examiner

FEATURE BASED ABSTRACTION AND MESHING

TECHNICAL FIELD

The present disclosure is directed, in general, to computer-aided design, engineering, visualization, and manufacturing systems ("CAD systems"), product lifecycle management ("PLM") systems, and similar systems, that manage data for products and other items (collectively, "Product Data Management" systems or PDM systems).

BACKGROUND OF THE DISCLOSURE

CAD systems are useful for designing and visualizing two-dimensional (2D) and three-dimensional (3D) models and drawings for manufacture as physical products. Improved systems are desirable.

SUMMARY OF THE DISCLOSURE

Various disclosed embodiments include a method for CAD operations and corresponding systems and computer-readable mediums are disclosed herein. A method includes receiving a model of a part to be manufactured, wherein the model includes a plurality of original faces. The method includes classifying each face in the model according to a relative face curvature according to classifications that include at least a high-curvature classification. The method includes classifying any sliver faces and narrow blend faces of the plurality of faces. The method includes merging contiguous faces in each classification. The method includes detecting special faces of the plurality of faces. The method includes restoring original faces in the high-curvature classification except for the special faces. The method includes processing shared edges of the restored original faces to produce merged faces. The method includes merging together any merged faces that produce a locally narrow face or an isthmus. The method includes storing a modified model of the part to be manufactured.

Various disclosed embodiments also include a data processing system including a processor. The data processing system also includes an accessible memory. The data processing system is particularly configured to perform processes as described herein.

Various disclosed embodiments further include a non-transitory computer-readable medium encoded with executable instructions that, when executed, cause one or more data processing systems to perform processes as described herein.

In some embodiments, processing the shared edges of the restored original faces to produce merged faces does not include merging shared edges that are G2 discontinuous. In some embodiments, processing the shared edges of the restored original faces to produce merged faces does not include merging shared edges that are shared by a sliver face or an isthmus face. Some embodiments include causing the part to be manufactured. In some embodiments, the special faces include one or more of a four-sided fillets, a bead, an annulus, a circular face, a locally narrow face, a narrow blend, and a sliver face. Some embodiments include computing a maximum mean curvature of each face and a maximum curvature of all faces, and wherein the relative face curvature of each face is a ratio of the curvature of that face to the maximum curvature of all faces. In some embodiments, the classifications include the high-curvature classification, a medium-curvature classification, and a low-curvature classification. Some embodiments include performing a process for identifying geometric discontinuous edges in the model. Some embodiments include performing a process for identifying geometric discontinuous edges in the model. Some embodiments include performing a feature abstraction process on the model. Some embodiments include performing a feature identification process for generic beads in the model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

CAD systems are used to design, model, visualize, and eventually manufacture parts for manufacture, and various commercial CAD and computer aided engineering (CAE) software products are available. However, exchanging CAD model data between different systems can be problematic. For example, for complex parts like the ones used for automotive carbody panels or aerospace structures, the CAD model contains small faces and edges that arise from CAD feature operators or as artifacts of translation when a CAD part developed in a one CAD software product then brought into another CAD software product. These small geometric edges and faces can cause significant problems in developing surface meshes that have an acceptable finite element mesh quality, especially when a geometry-associative mesh has to meet the constraint of placing nodes on vertices, edges and faces.

Generally, that automotive industry and other industries have a set of stringent mesh quality criteria for specific solvers using finite element analysis (FEA) techniques. A mesh of acceptable quality for body panels, for example, can only be geometry-associative when certain geometry abstraction is performed on the model before creating the mesh.

Disclosed embodiments incorporate a rich feature-sensitive abstraction (or "abstraction," as used herein) as part of the mesh process to produce a high-quality mesh for products to be manufactured. Face curvature evaluation helps to determine edges that define essential features in the model. Disclosed processes can incorporate user-specified mesh parameters to split and merge face boundaries so that the geometry and the mesh generated on it subsequently captures all relevant features.

Disclosed embodiments also include improved meshing processes for reading and recognizing features to create a high quality overall mesh that passes mesh quality checks.

Some meshing techniques follow a specific process of performing abstraction, then meshing at user defined size with specific meshing parameters, then performing mesh cleanup to adhere to prescribed mesh quality.

Figure 1A:
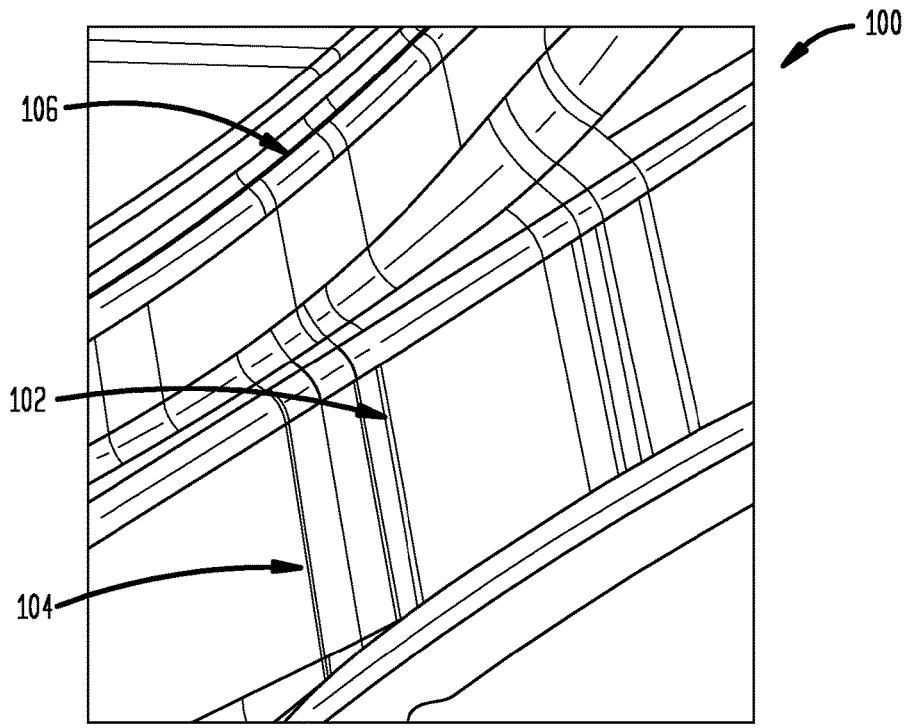
FIG. 1A illustrates an example of sliver faces in accordance with disclosed embodiments.
Figure 1B:
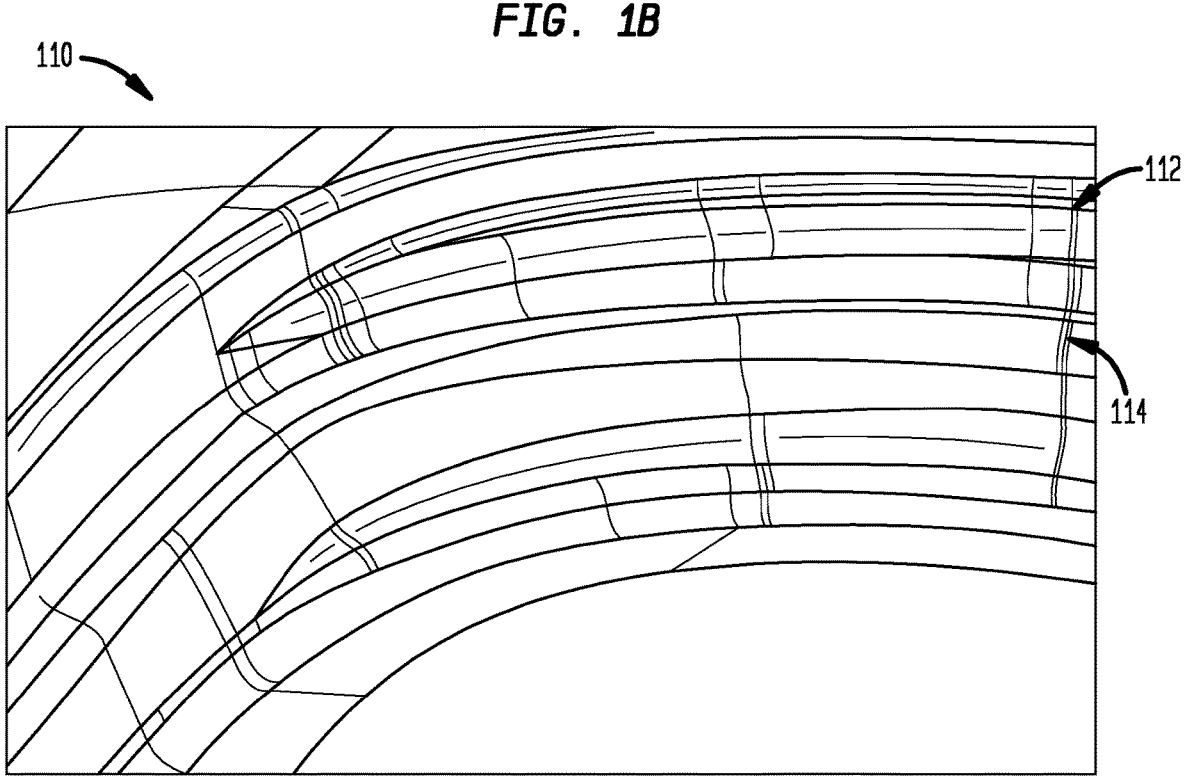
FIG. 1B illustrates an example of sliver faces in accordance with disclosed embodiments.

For consistent reference, some terms as used herein are defined as follows. A "sliver face" refers to a narrow face or a face whose area to perimeter ratio is below a certain threshold. FIG. 1A illustrates an example of sliver faces 102, 104, and 106 of a portion of a model 100. FIG. 1B illustrates an example of sliver faces 112 and 114 of a portion of a model 110. Note that, in these examples, these sliver faces are so thin that they appear as nothing more than thick lines; these are faces with negligible areas.

Figure 2A:
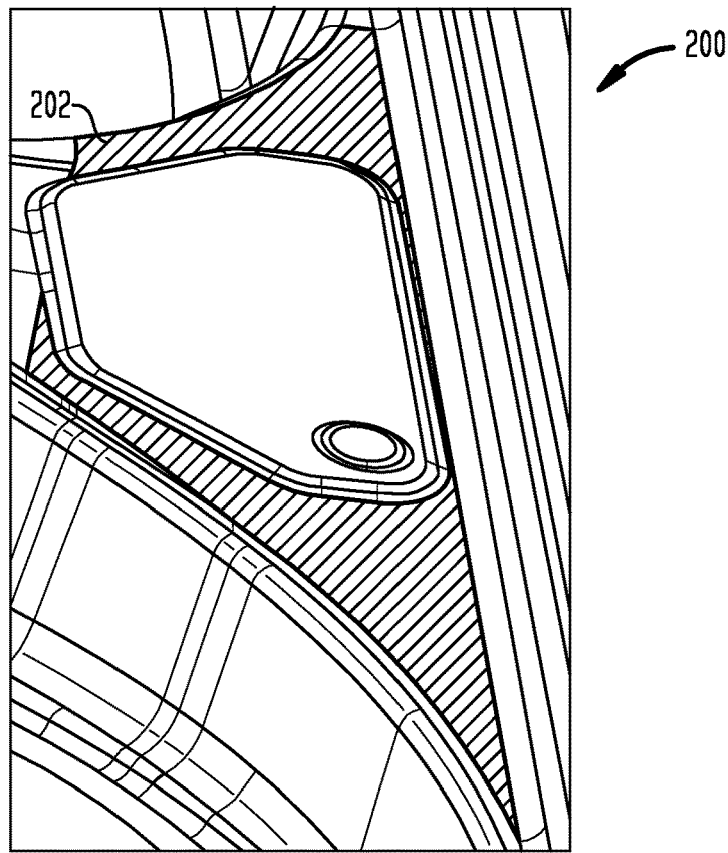
FIG. 2A illustrates an example of an isthmus face in accordance with disclosed embodiments.
Figure 2B:
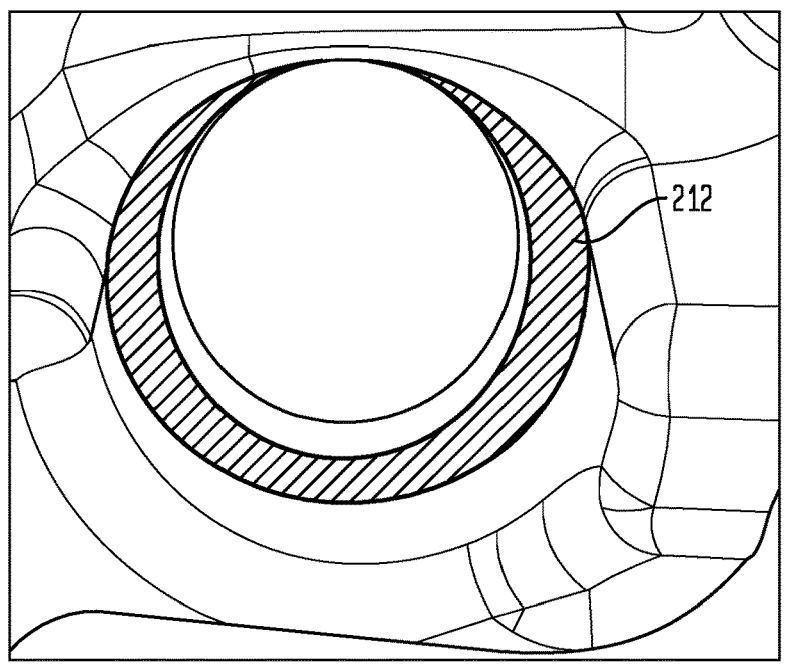
FIG. 2B illustrates an example of an isthmus face in accordance with disclosed embodiments.

An "isthmus face" refers to a face that has a narrow area below a certain threshold. FIG. 2A illustrates an example of an isthmus face 202 of a portion of a model 200. FIG. 2B illustrates an example of an isthmus face 212 of a portion of a model 210.

Figure 3A:
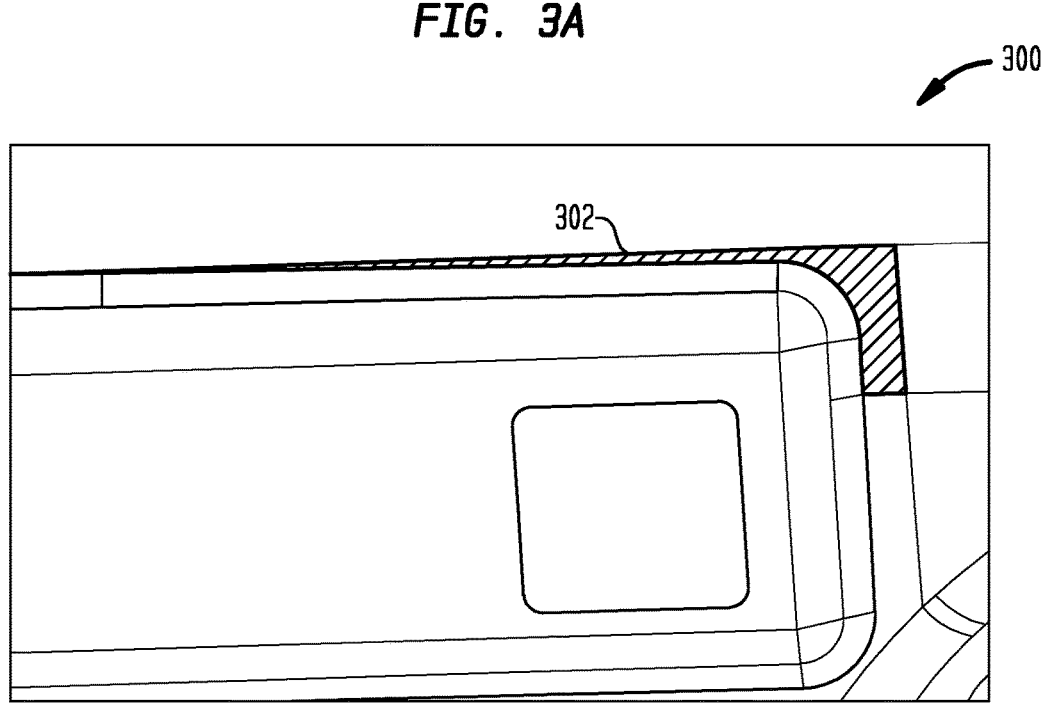
FIG. 3A illustrates an example of a locally narrow face in accordance with disclosed embodiments.
Figure 3B:
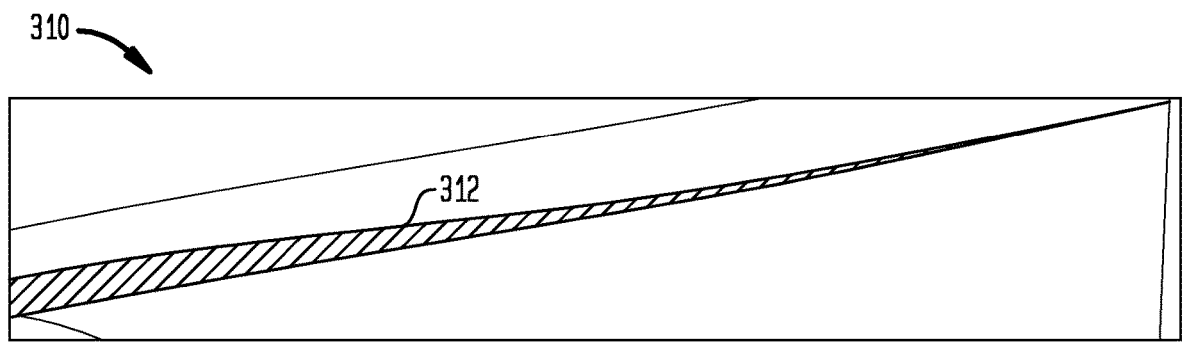
FIG. 3B illustrates an example of a locally narrow face in accordance with disclosed embodiments.

A "locally narrow face" refers to a face that is not thin as a sliver face, nor does it have a pronounced isthmus but has a narrow "tail" that can impose undue constraint on meshing and can lead to poor mesh quality. FIG. 3A illustrates an example of a locally narrow face 302 of a portion of a model 300. FIG. 3B illustrates an example of a locally narrow face 312 of a portion of a model 310.

Figure 4:
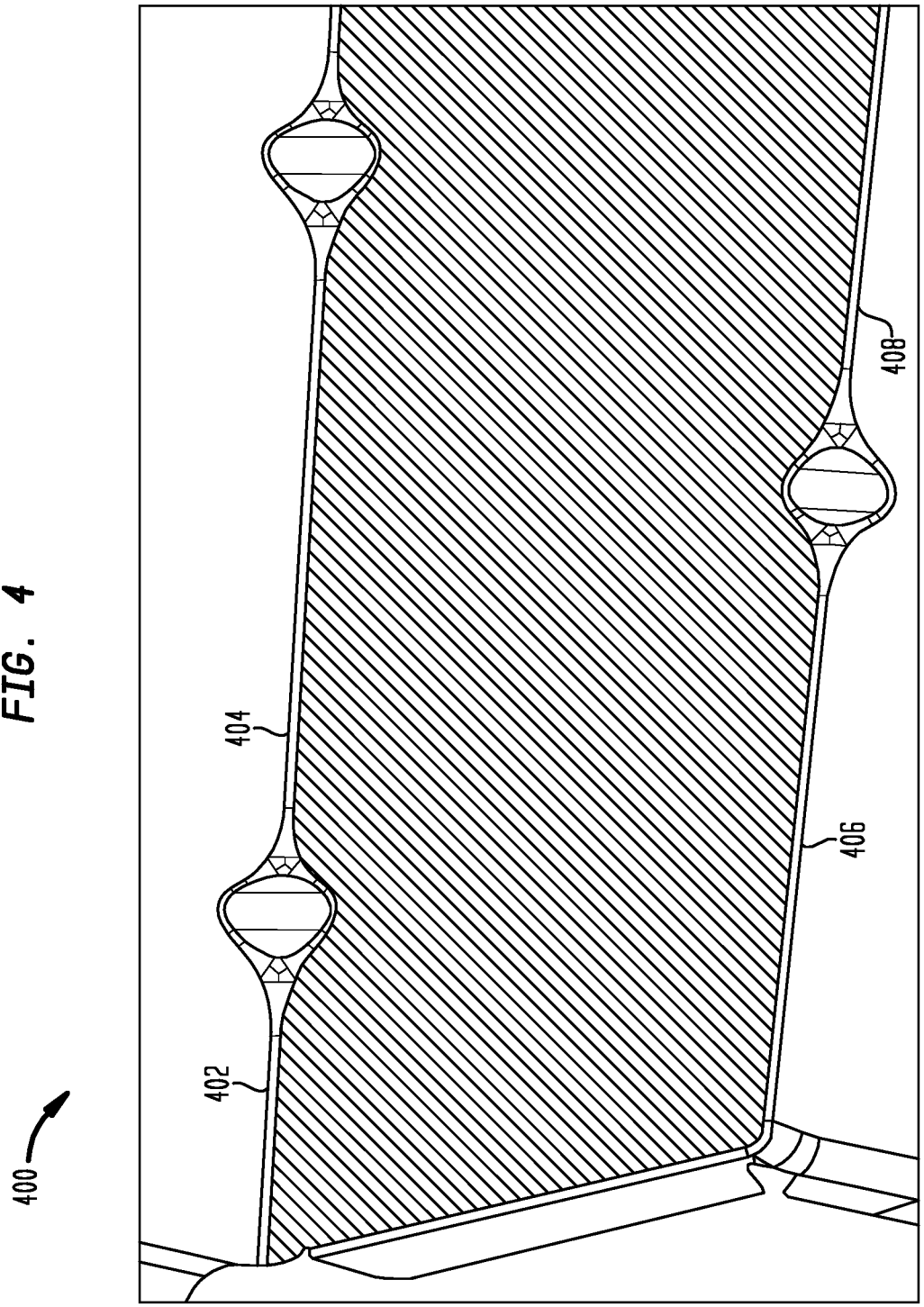
FIG. 4 illustrates examples of narrow blends in accordance with disclosed embodiments.

A "narrow blend" refers to a narrow face that is a sliver at a little more than two times minimum element size as defined by user and is characterized by unidirectional or bidirectional curvature, often times flanked by planar faces. FIG. 4 illustrates examples of narrow blends 402, 404, 406, and 408 of a model 400.

Figure 5:
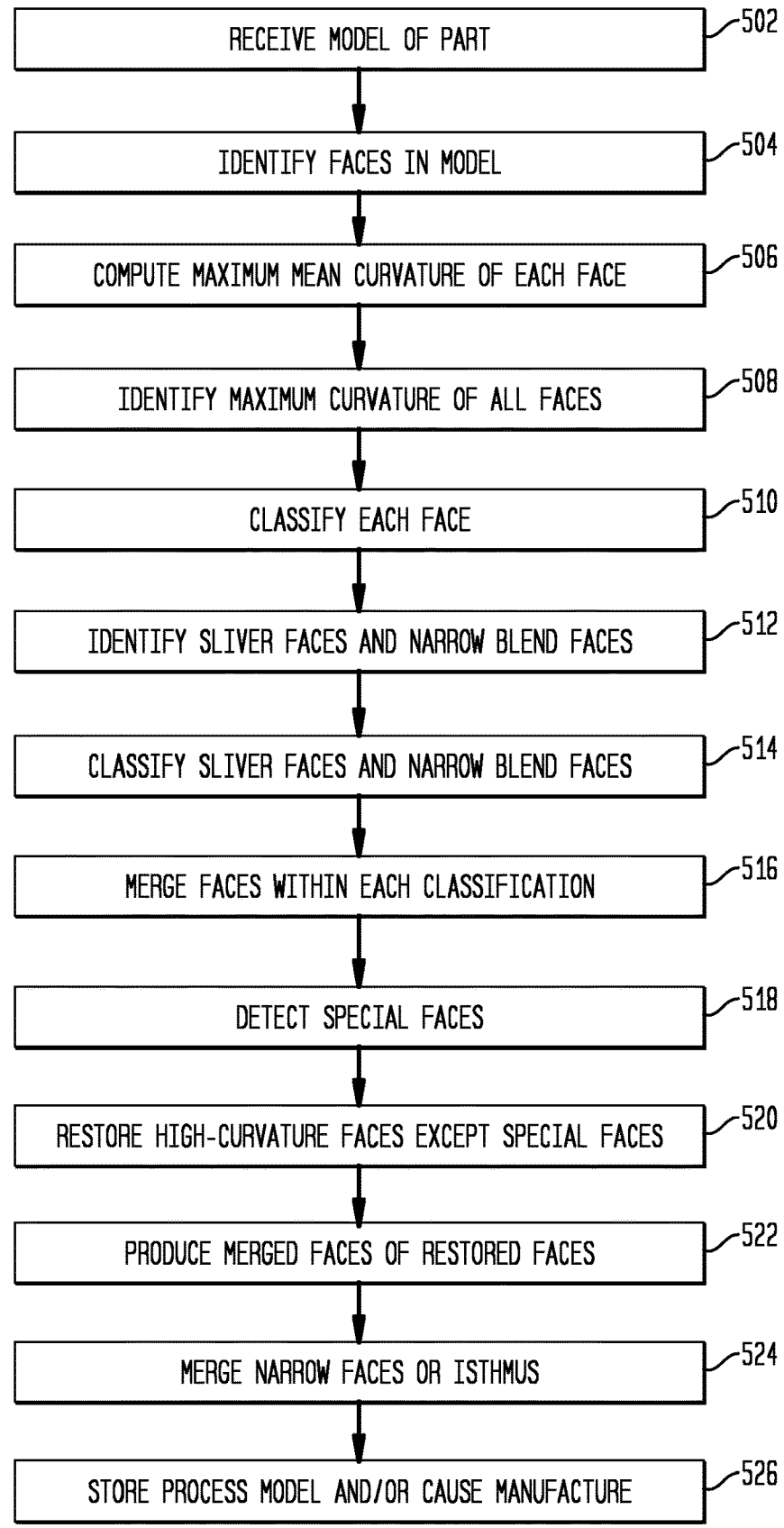
FIG. 5 illustrates a process in accordance with disclosed embodiments.

FIG. 5 illustrates a process 500 in accordance with disclosed embodiments, that can be performed by a data processing system as disclosed herein, or by another system configured to perform process as described herein, referred to generically below as the "system."

The system receives a model of a part to be manufactured (502). The model can be represented by 2D model data or 3D solid model data. This can include an entire model of the part or can include only a subset of the elements of the model. Receiving, as used herein, can include loading from storage, receiving from another device or process, receiving via an interaction with a user, or otherwise.

Figure 6:
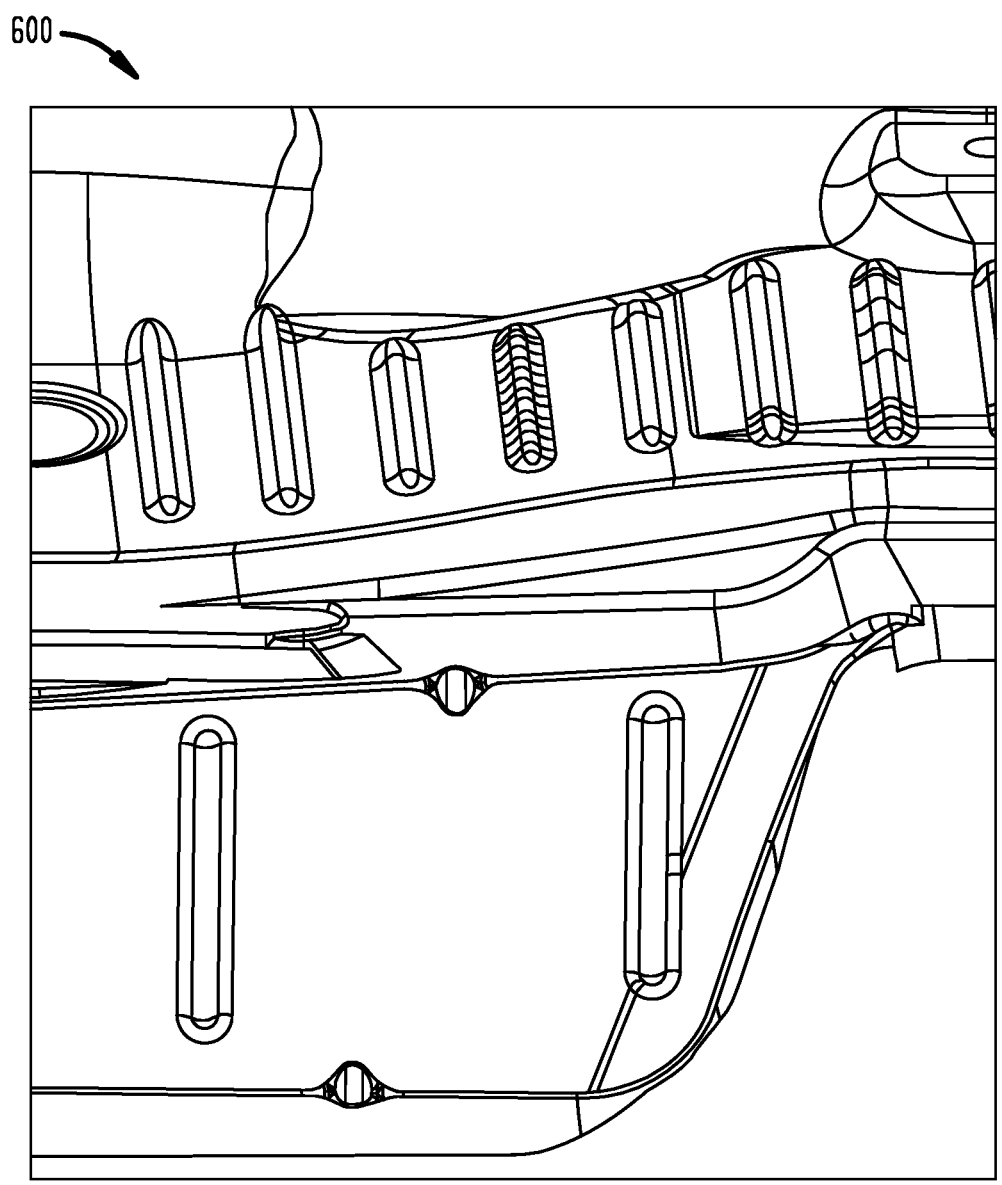
FIG. 6 illustrates an example of a model of a part to be manufactured including a plurality of faces in accordance with disclosed embodiments.

FIG. 6 illustrates an example of a model 600 of a part to be manufactured including a plurality of faces.

Returning to the process of FIG. 5, the system identifies faces in the model (504). This can include every face in the model (and would, in a typical process) or can include a subset of faces, such as for a portion of the model selected by a user.

The system computes a maximum mean curvature of each identified face (506).

The system identifies a maximum curvature for all identified faces based on the maximum mean curvature of each identified face (508).

The system classifies each identified face according to a relative face curvature for each identified face (510). The relative face curvature for a face can be calculated as a ratio of the curvature of the face to the maximum curvature for all identified faces. The system can classify each face in, for example, one of three classifications or "zones": a low-curvature zone for faces with a relative face curvature value between 0 to 20%, a medium-curvature zone for faces with a relative face curvature value between 20% to 40% and high curvature zone for faces with a relative face curvature value of more than 40%. As part of this step, the system can designate one of more faces as "fillet" (blend) faces or "cylinder" faces that are always placed in the high curvature zone. The fillet or cylinder faces can be designated based on a user input or user-specified parameters.

The system identifies sliver faces and narrow blend faces (512). The system can use a user-defined "minimum element size" to identify sliver faces as well as narrow blend faces. As part of this step, the system can also use the "minimum element size" to discover and cut faces with narrow tail and isthmus regions in order to break up the parent face into a sliver face and a non-sliver face.

The system classifies sliver faces and narrow blend faces (514). Any sliver face surrounded by faces of a specific zone is classified in that zone. Any identified narrow blend face is split along the middle and the resulting half-faces are merged into and classified with abutting faces. The system can perform medial object processing.

Figure 7:
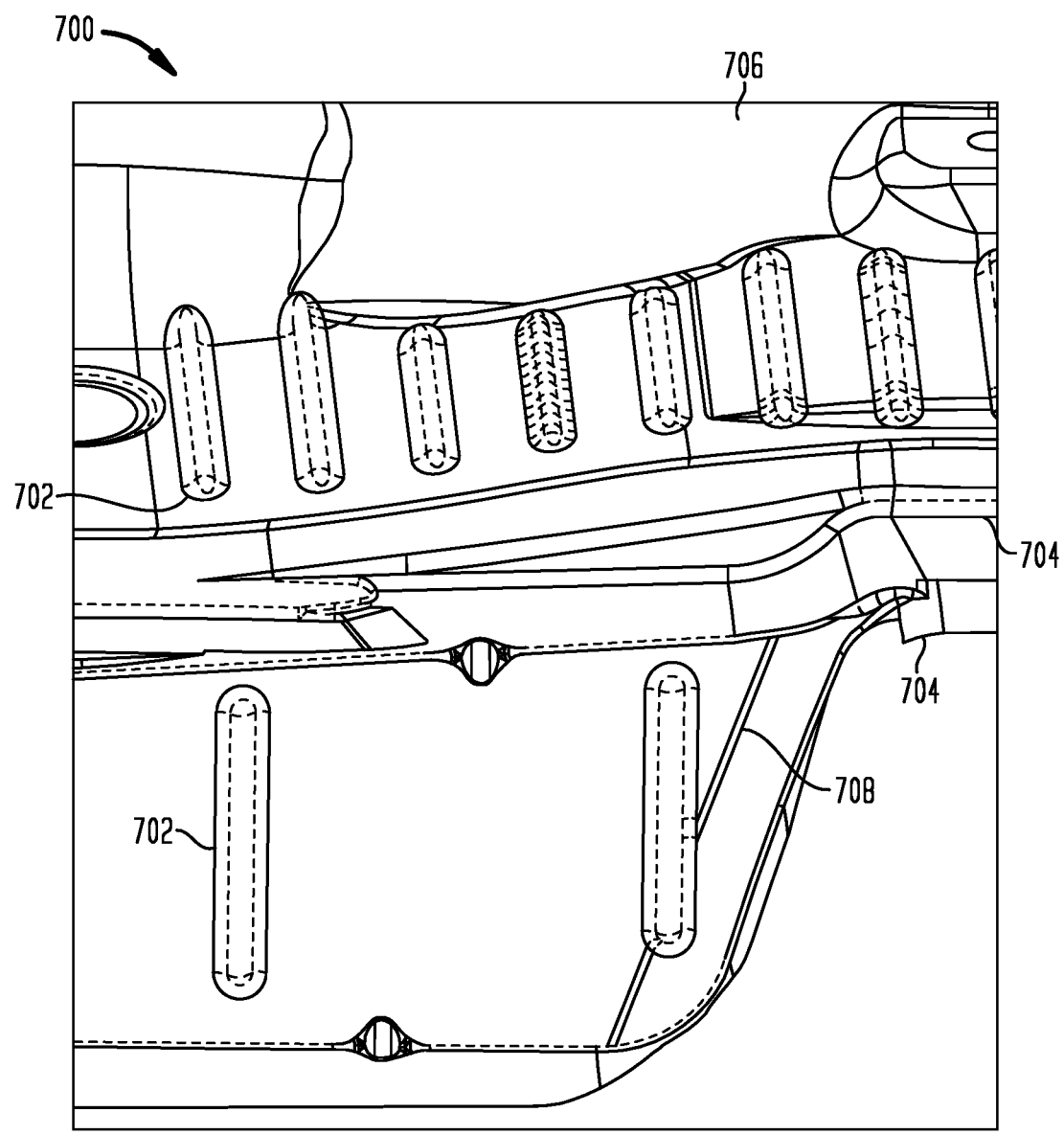
FIG. 7 illustrates classification of faces in a model along with identification and classification of narrow blend faces in accordance with disclosed embodiments.

FIG. 7 illustrates classification of faces in a model 700 along with identification and classification of narrow blend faces. These include, in this example, high curvature faces 702, medium curvature faces 704, low curvature faces 706, and narrow blends 708.

Returning to the process of FIG. 5, the system merges faces within each contiguous zone of the model (516). The system can merge the adjacent faces within each zone into a single face. This may result, for example, in two medium-curvature zone faces if the original medium-curvature zone faces were not all adjacent.

Figure 8:
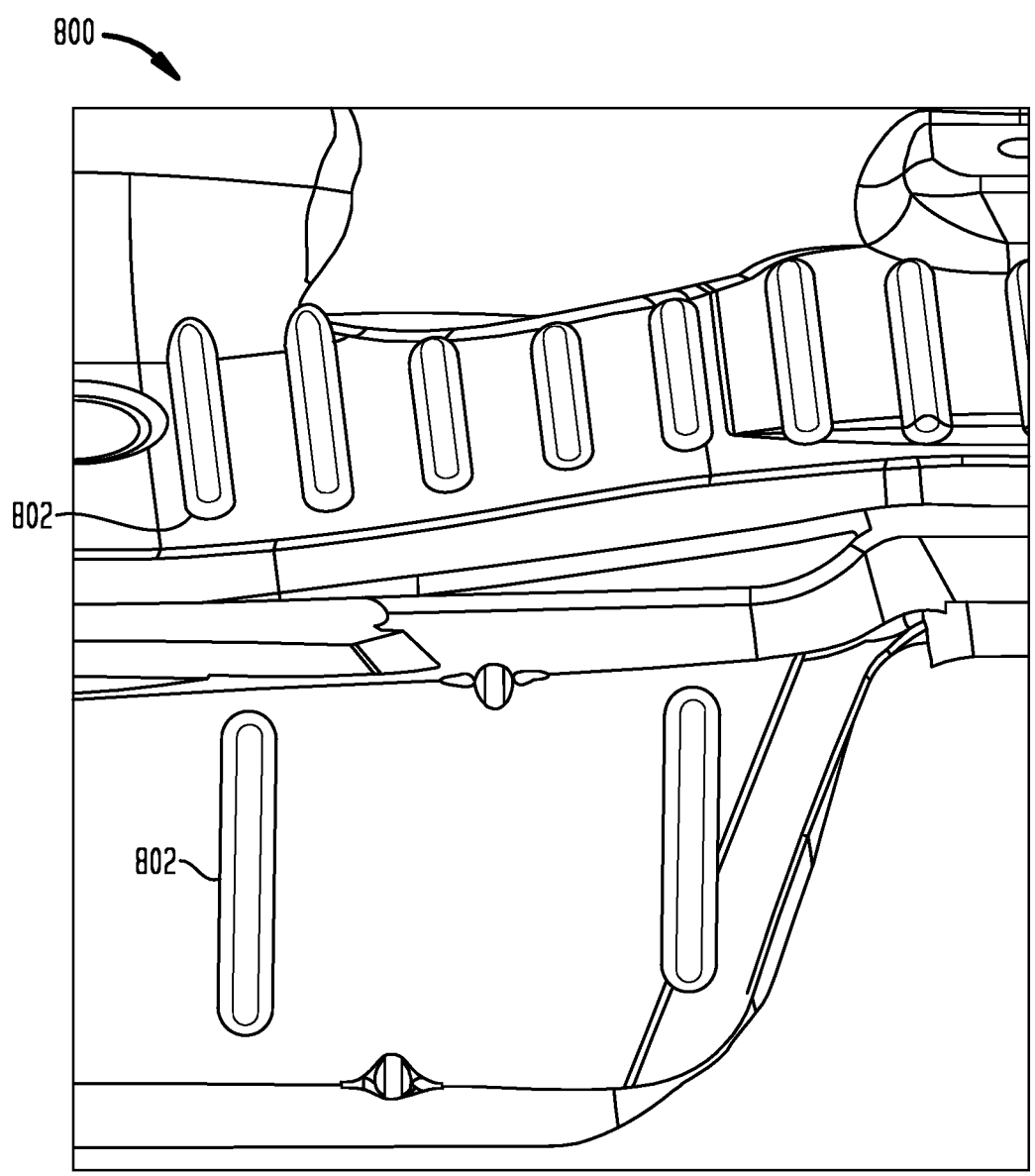
FIG. 8 illustrates merging faces within a zone and processing medial objects in accordance with disclosed embodiments.

FIG. 8 illustrates merging faces within a zone (as in 516) and processing medial objects (as in 514) in a model 800. Note, for example, that the adjacent high-curvature faces 702 illustrated in FIG. 7 have been merged into include merge faces 802 in FIG. 8.

At this point, the process may produce inaccurate results if actions as described below are not also performed. That is, for example, ending a process with 506 can result in merging feature edges, particularly in the high-curvature zones. In such a case, the mesh does not truly represent the features in the model.

Figure 9A:
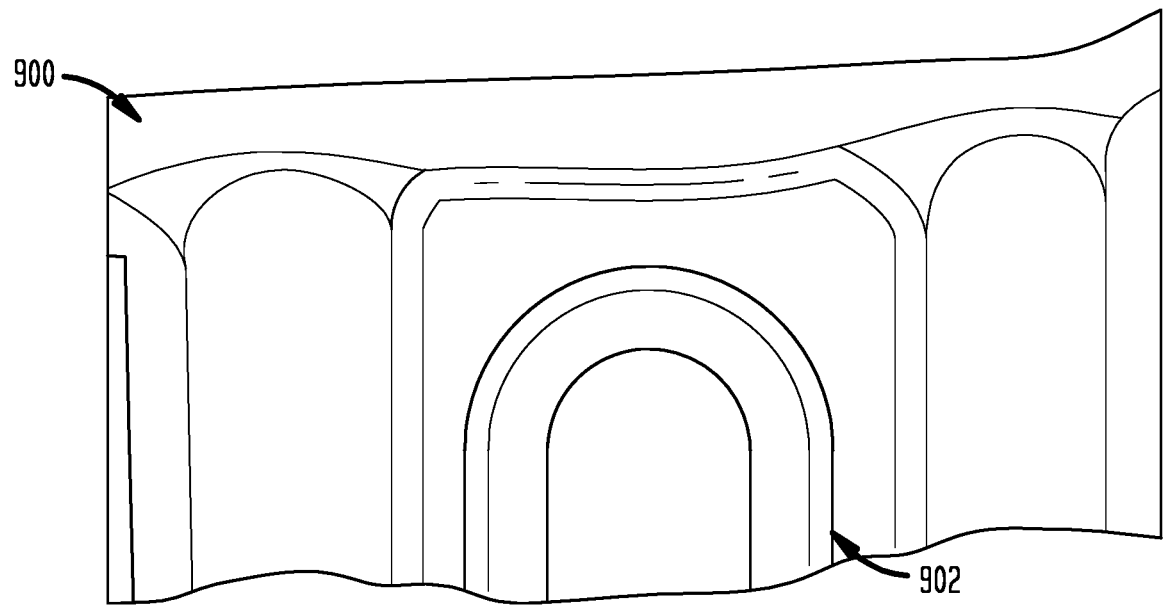
FIGS. 9A and 9B illustrate meshing errors that can occur.
Figure 9B:
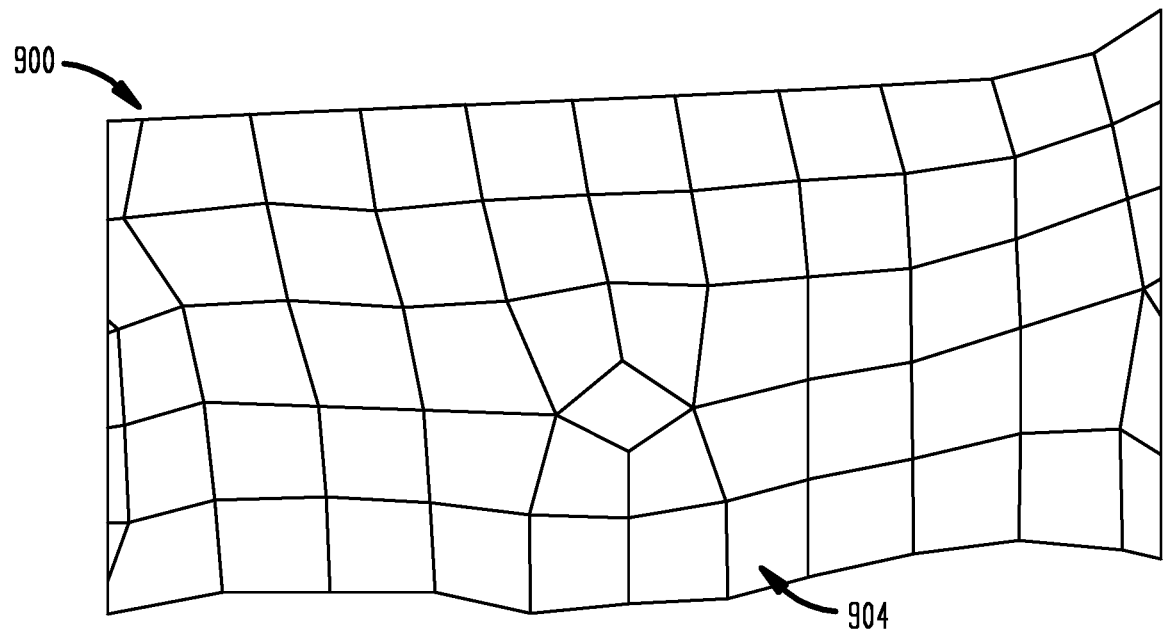

FIGS. 9A and 9B illustrate meshing errors that can occur. FIG. 9A illustrates a model 900 with abstracted geometry in a high-curvature zone 902 showing symptoms of over-merging, and FIG. 9B illustrates a mesh on the abstracted geometry of the same model 900 that goes over feature edges in the model, for example at 904.

There are some limited approaches that can address these issues. Some pattern recognition or "templatized" mesh generation can be used, but templatized meshing on patterned geometry can be very limiting and only works well for a certain class of problems in a certain industrial application but not in a generic sense.

Specialized meshing processes can be used to identify and mesh features such as four-sided fillets, I-shaped beads, annuli, and circular faces. One strategy to mesh these features is addressed in United States Patent Publication US20170061037, hereby incorporated by reference. However, many other types of features can exist in a given model. For example, not all fillets are four-sided and thus cannot be map-meshed, and beads other than the I-shape may be present and need a structured mesh that honors the feature centerline as described and illustrated below. Different models can have flanges, local depressions, etc., all of which are features that need to be understood by the meshing processes so as to generate accurate meshing patterns on them.

Some processes can identify and partition out thin-sheet and long-slender features from complex model geometries to produce structured swept hexahedral meshes. These approaches can use a 3D medial object to identify thin-sheet regions and partition them away from the original 3D solid. Then, on the residual body, a series of metric tensors can be employed using local geometric sizing measures based on face thicknesses, face curvatures, and 2D medial objects. These metric tensors corresponded to ellipsoids which are classified based on their aspect ratio. Anisotropic ellipsoids can then be employed to identify long-slender features which were automatically partitioned out of the solid with a series of Boolean operations and a medial bracelet technique. Finally, the dimensions of the ellipsoids can be used to efficiently size the mesh by imparting a biased grading along the sweep direction of the mesh.

Disclosed embodiments include a strategy to enhance the existing abstraction result on a body panel for the faces involved with high curvature zones, described further in the context of the process of FIG. 5. For convenient reference, a few additional terminologies used in the modified strategy are as follows. A "bead" is defined as a single composite high curvature face, the composition of which are multiple faces, predominantly all with relative face curvature value in the high curvature zone. This composite face has a tangent outer boundary.

Figure 10A:
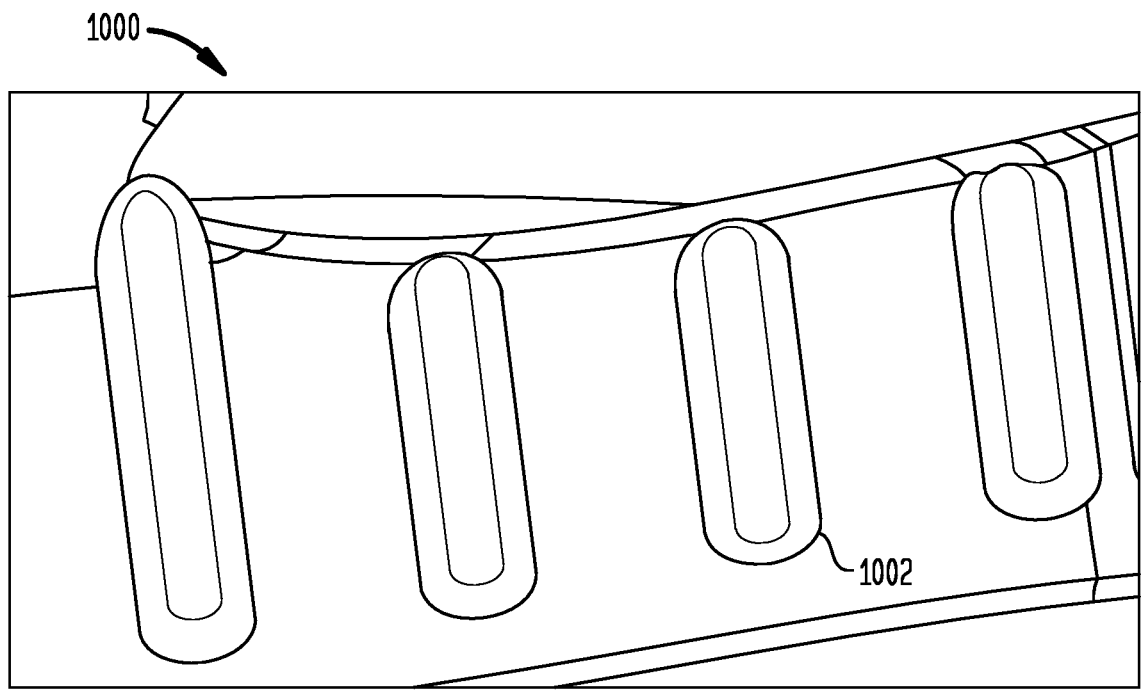
FIGS. 10A and 10B illustrate beads in accordance with disclosed embodiments.
Figure 10B:
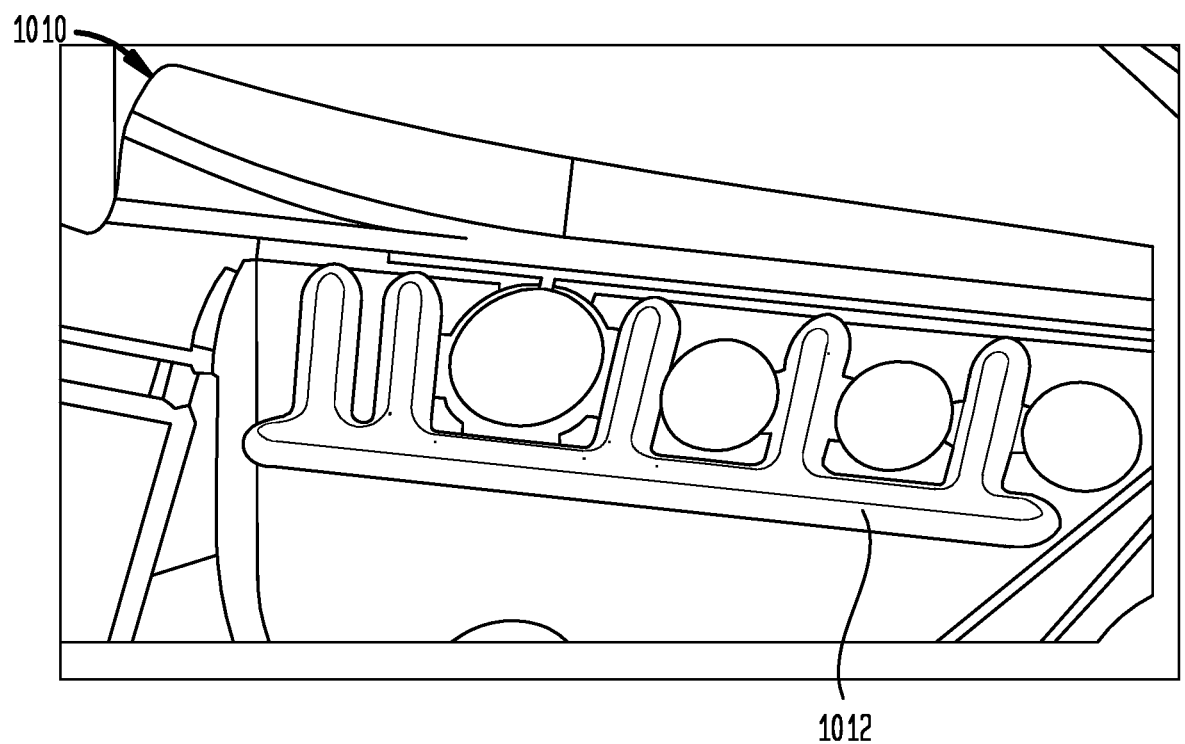

FIGS. 10A and 10B illustrate beads. FIG. 10A illustrates a bead feature 1002 on a model 1000, and FIG. 10B illustrates a generic bead 1012 on a model 1010.

For purposes of the discussion herein, it may be helpful to describe certain certain geometric continuity/discontinuity terms. The geometric continuity of an edge that is shared by two faces relates to the smoothness of the meeting between the two faces. G0 refers "point continuity," meaning that two curves touch each other. G1 refers to two curves that not only touch, but also go the same direction at the point where they touch. Mathematically, the first derivative of the two curves is equal at the point where they touch.

G2 adds the requirement that the curves not only go the same direction when they meet, but also have the same radius at that point. Mathematically, both the first and second derivatives of the equations are equal at that point.

G3 adds the requirement of planar acceleration. Curves that are G3 continuous touch, go the same direction, have the same radius, and that radius is accelerating at the same rate at a certain point. Mathematically, G3 continuous curves have equal third derivatives. Finally, G4 continuous curves have all the same requirements as G3 curves, but their curvature acceleration is equal in three dimensions.

Five levels of continuity are commonly used in CAD systems, as discussed above. With G0 continuity, the curves touch. In G1, the curves touch and go the same direction. With G2 continuity, the curves touch, go the same direction, and have equal radii at the contact point. With G3 continuity, the radii of the curves are equal and accelerating at the same rate, and with G4 continuity, the acceleration takes place in 3D space.

For faces with continuous arc-length parametric derivatives the degree of geometric continuity of the shared edge denotes the highest order of derivatives of the adjacent faces that are the same. This corresponds to common face normals for first-order geometric continuity (G1) and common face normals and principal curvatures for second-order geometric continuity (G2).

Geometric discontinuity is the inverse of continuity so a G1 discontinuous edge has normals that differ for the adjacent faces and a G2 discontinuous edge has normals that are the same but principal curvatures that are different for the adjacent faces. G1 and G2 discontinuous edges are generally important features and it is preferable to preserve them in abstraction.

Figure 11:
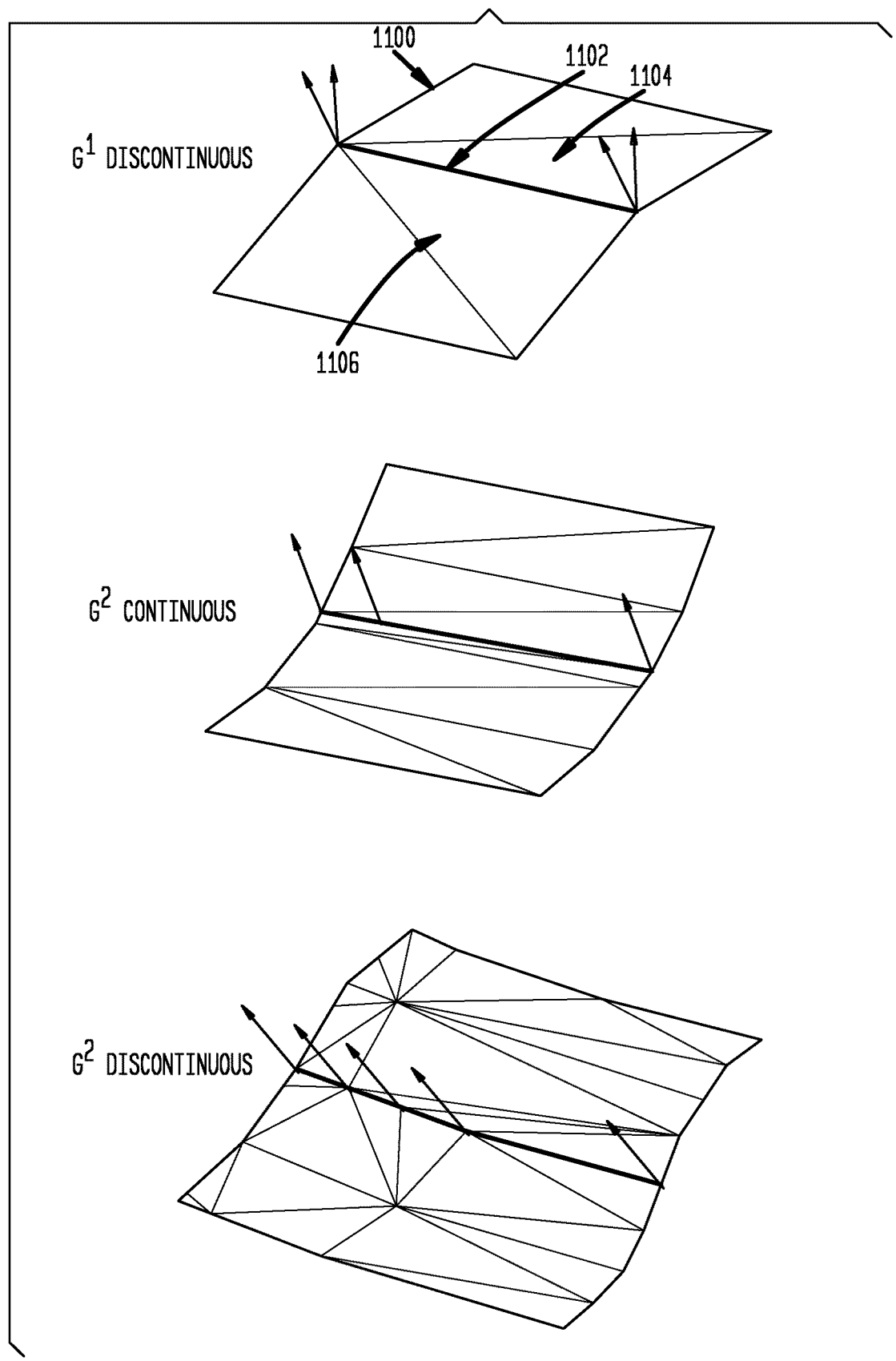
FIG. 11 illustrates examples of G1 continuous and G2 continuous and discontinuous edges in accordance with disclosed embodiments.

FIG. 11 illustrates examples of G1 continuous and G2 continuous and discontinuous edges. Note in the example of surface 1100, shared edge 1102 is shared between element 1104 and element 1106.

Faces in a CAD/CAE model are piecewise smooth triangulations but they represent CAD analytic faces with continuous parametric derivatives. Therefore numerical approximation can be used assess the degree of geometric continuity of edges.

Figure 12:
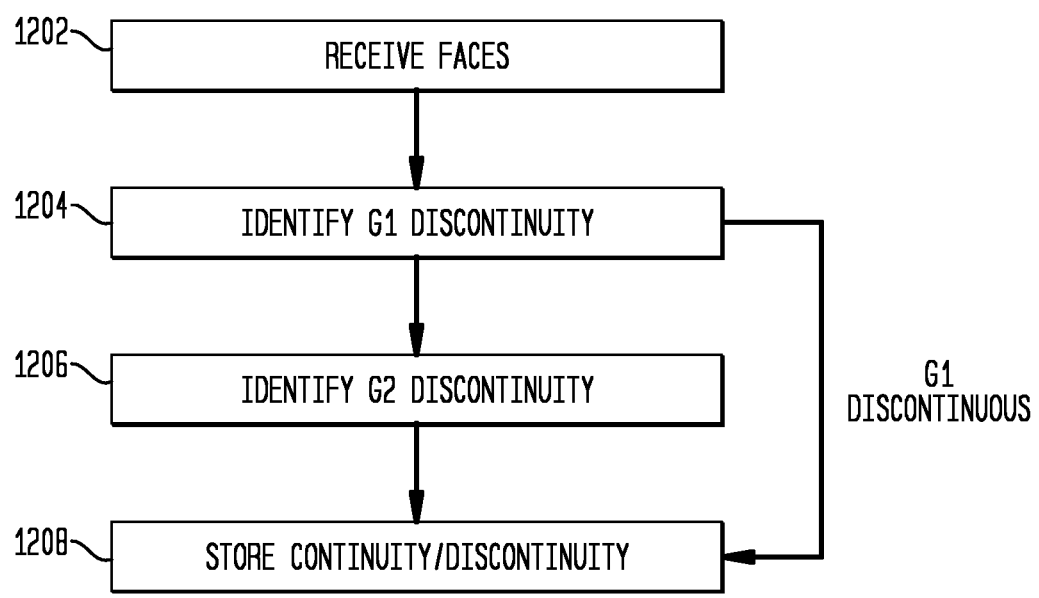
FIG. 12 illustrates one process for identifying geometric discontinuous edges in accordance with disclosed embodiments.

FIG. 12 illustrates one process 1200 for identifying geometric discontinuous edges in accordance with disclosed embodiments.

The system receives two faces (1202).

The system identifies whether there is a G1 discontinuity at the edge between the two faces (1204). In some embodiments, to do so, the system computes the dot products of pairs of normals at the facet points of the edge. If the minimum computed value is less than a threshold (for example, cos 175°), then the edge is at least G1 continuous. Otherwise, the edge is G1 discontinuous and the process store the determined continuity/discontinuity (1208) and can end.

If the edge is at least G1 continuous then the system edge determines whether there is a G2 discontinuity at the edge (1206). In some embodiments, to do so, the system approximates, for each facet point, the principal curvature values and directions, $\kappa_1$, $\kappa_2$, $e_1$ and $e_2$, for both of the faces. The system can make local estimates at facet points by solving a least-squares-best-fit quadratic height function to the 1-rings of facet points and their normals, such as described by *An analysis and comparison of parameterization-based computation of differential quantities for discrete surfaces*, Comput. Aided Geom. Des. 26 (5) (2009). Curvature tensor matrices [4, Taubin], $K_p$ are formed by $$K_p = \begin{pmatrix} | & | & | \\ e_1 & e_2 & n \\ | & | & | \end{pmatrix} \begin{pmatrix} K_1 & . & . \\ . & K_2 & . \\ . & . & . \end{pmatrix} \begin{pmatrix} - & e_1 & - \\ - & e_2 & - \\ - & n & - \end{pmatrix} \quad (1.1)$$

where n is the local face normal. The Frobenius norm difference between the curvature tensors of the two adjacent faces are then computed as $\|K_{p2}-K_{p1}\|_F$ for each facet point of the edge. If the minimum computed value is less than a threshold then the edge is at least G2 continuous. Otherwise the eds is G2 discontinuous. A benefit of this calculation is that the result is invariant to change in coordinate system or rotation of the model. However, the result is dimensional with units 1/distance (as per curvature). Therefore an appropriate threshold must be selected for each model.

Figure 13:
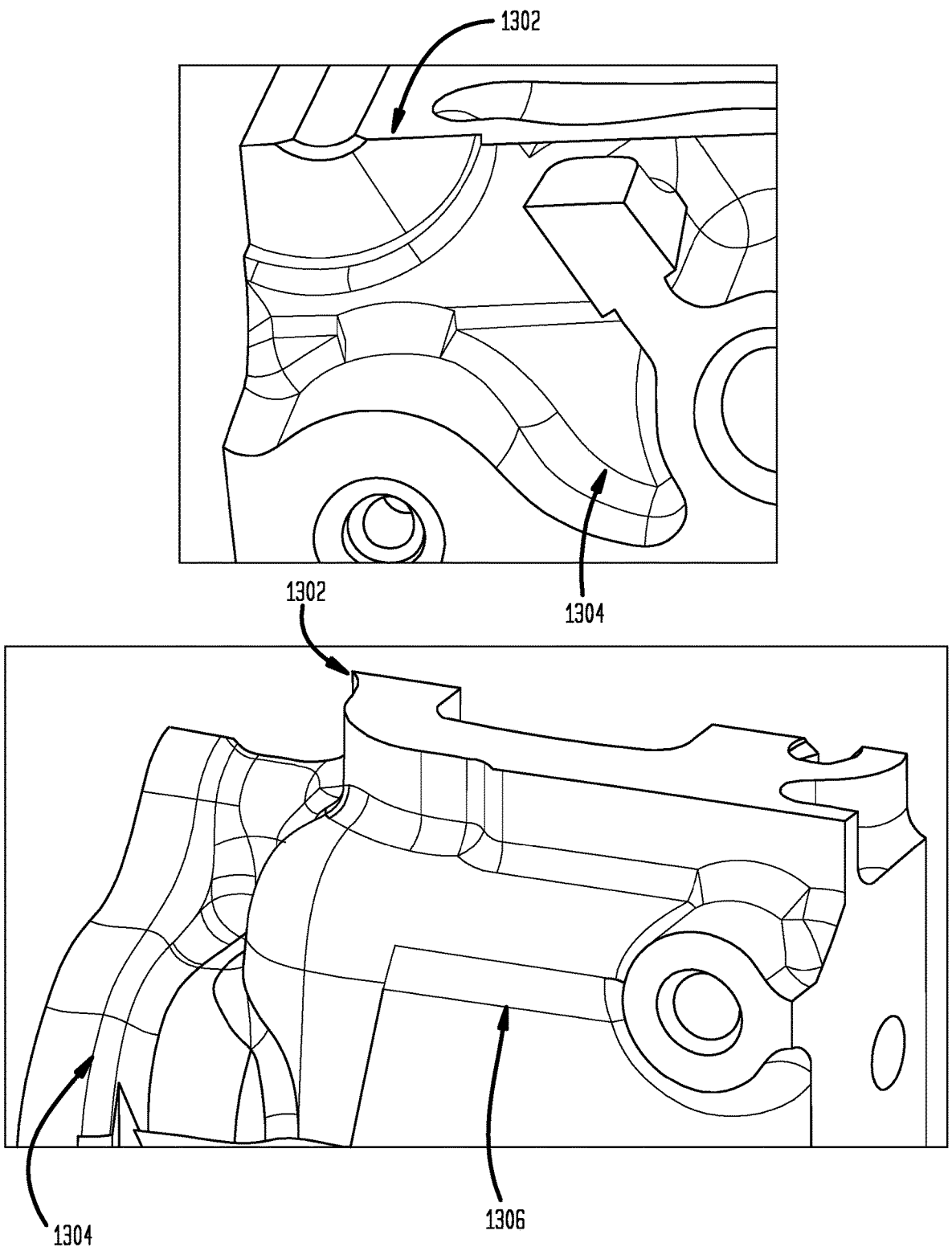
FIG. 13 illustrates examples of detected continuity discontinuity in accordance with disclosed embodiments.

FIG. 13 illustrates examples of detected continuity discontinuity in accordance with disclosed embodiments. This example shows G1 discontinuous edges 1302, G2 continuous edges 1304, and G2 discontinuous edges 1306 (among other edges).

Returning to the process of FIG. 5, to avoid the problems discussed above, the system performs additional actions.

The system detects special faces, such as beads, in the model (518). These faces have a good mesh quality and need not be modified. These faces are part of the high curvature group.

The system restores the original faces in the high curvature zones, other than the detected special faces (520). The special faces, and feature faces such as beads, are also faces with high curvature and are part of the high curvature group. After merging is performed within the high curvature group, these special faces result. Other than these special faces, the other faces within these groups are "undone" or "decomposed" for further G2 processing. By excluding the special faces, the G2 processing will not destroy these special (feature) faces.

The system processes shared edges of the restored original faces to produce merged faces (522). The system can find shared edges of each of the restored original faces. The system can mark each shared edge as a G2 edge if the edge is G2 discontinuous. The system can merge the shared edges of the restored original faces except for edges marked as G2 discontinuous edges and edges that are shared by a sliver face or an isthmus face.

The system merges together any of the merged faces that produced a locally narrow face or isthmus (524). In such case, back as the success and quality of mesh takes precedence over preserving a feature edge.

The system stores processed model according to the modifications made above (526). This can further include manufacturing a part or product according to the processed model.

Figure 14:
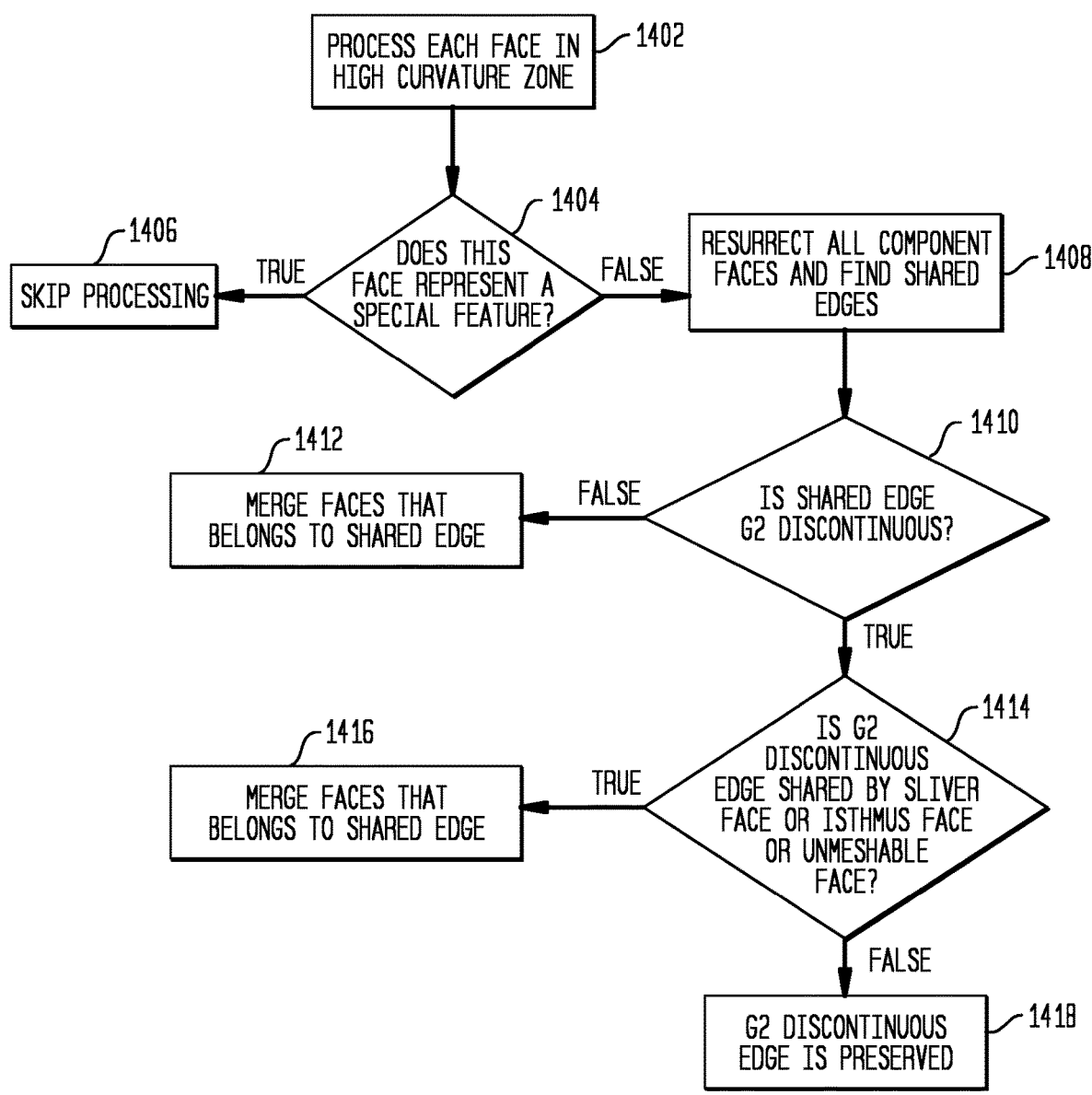
FIG. 14 illustrates a flowchart of a process to perform feature abstraction in accordance with disclosed embodiments.

FIG. 14 illustrates a flowchart of a process 1400 to perform feature abstraction in accordance with disclosed embodiments, that can in some cases be performed as part of the process of FIG. 5.

The system processes each face in each high-curvature zone (1402), as below.

The system determines if each given face represents a special face (1404).

If so, the system can skip processing that face (1406).

Otherwise, the system resurrects all component faces and finds the shared edges (1408).

For each shared edge, the system determines if the shared edge is G2 discontinuous (1410).

When the shared edge is not G2 discontinuous, the system merges the faces that belong to the shared edge (1412).

When the shared edge is G2 discontinuous at 1410, the system determines whether the G2 discontinuous edge is shared by any one of a sliver face, an isthmus face, or an unmeshable face (1414).

When the G2 discontinuous edge is shared by any one of a sliver face, an isthmus face, or an unmeshable face at 1414, the system merges faces that belong to the shared edge (1416).

When the G2 discontinuous edge is not shared by any one of a sliver face, an isthmus face, or an unmeshable face at 1414, the system preserves the G2 discontinuous edge (rather than merging faces) (1418).

Various embodiments can include enhancements to the meshing process to create specific meshes on specific features.

The system perform specific processes for generic beads. A common characteristic that generic bead features typically exhibit is a smooth boundary. Consequently, the system can identify these faces by checking for tangent continuity around their periphery. On the outer loop of the face, the edge tangent, t, can be evaluated according to equation 1.2 below for the start and end vertex of every edge.

$$t = \frac{dx}{ds} \quad (1.2)$$

where x(s) is the natural representation of a regular curve.

Figure 15:
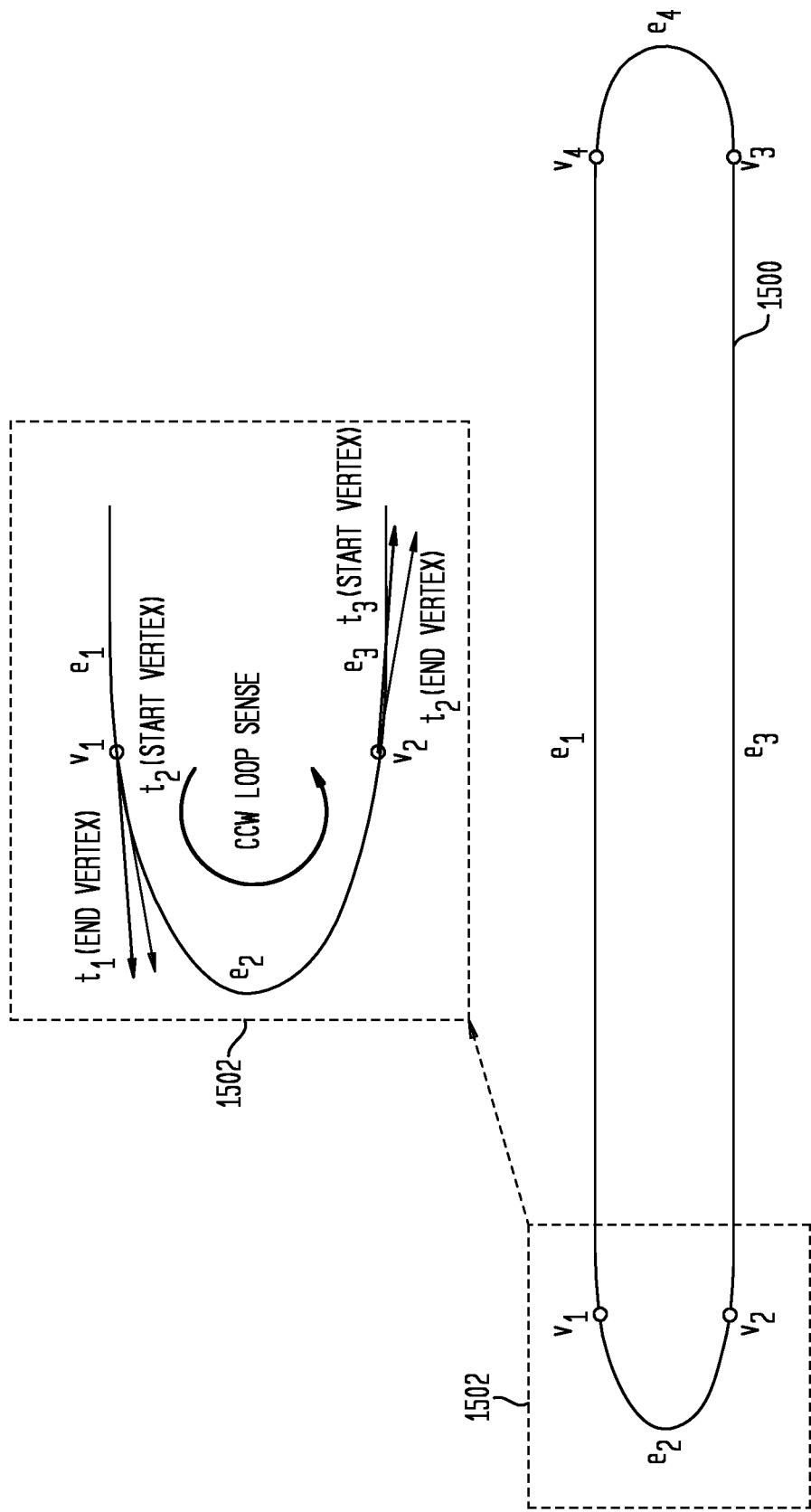
FIG. 15 illustrates a tangent continuity check on generic bead feature in accordance with disclosed embodiments.

FIG. 15 illustrates a tangent continuity check on generic bead feature 1500 that can be performed by a system as disclosed herein, as performed in area 1502. By evaluating the angle between tangents for respective edges $e_{curr}$ and $e_{next}$ connected to each vertex it is possible to identify non-continuous aberrations on the outer boundary, which would disqualify the feature as a bead according to equation 1.3.

$$t_{curr} \cdot t_{next} < \alpha \quad (1.3)$$

where α is a user defined tolerance and $t_{curr}$ and $t_{next}$ are the edge tangents in and out of a vertex respectively.

Figure 16:
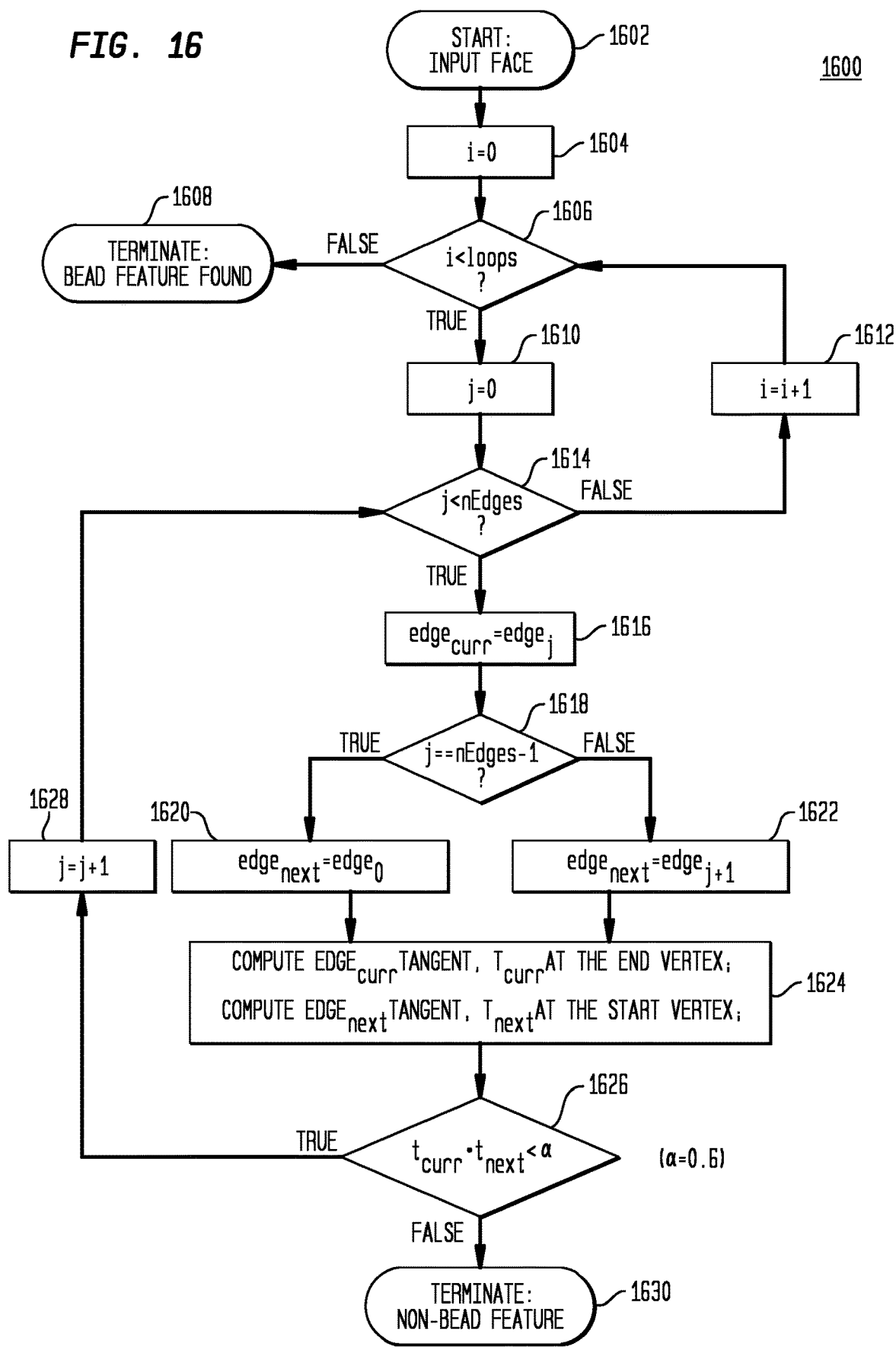
FIG. 16 illustrates a flowchart of a process 1600 to perform feature identification for generic beads in accordance with disclosed embodiments.

FIG. 16 illustrates a flowchart of a process 1600 to perform feature identification for generic beads in accordance with disclosed embodiments that can in some cases be performed as part of the process of FIG. 5. Various terms as used herein include:

i and j refer to integers which are counters for each iteration of the algorithm;

a "loop" refers to a circular sequence of edges in counter-clockwise order;

an edge refers to a segment of the boundary of a face;

nEdges refers to the total number of edges in the face;

$t_{curr}$ refers to a tangent vector at the edge end vertex;

$t_{next}$ refers to a tangent vector at the edge start vertex;

$edge_{curr}$ refers to the current edge in the loop;

$edge_{next}$ refers to the next edge in the loop;

α refers to a double precision number defining a tolerance; and

· is the dot product operator.

The system receives an input face (1602).

The system sets i=1 (1604).

The system determines whether i is less than the number of loops (1606).

When i is not less than the number of loops, the process terminates since a bead feature has been found (1608).

When i is less than the number of loops at 1606, the system sets j=0 (1610).

The system determines whether j is less than nEdges (1614).

When j is not less than nEdges, the system increments i (i=i+1) (1612) and the process returns to 1606.

When j is less than nEdges, the system sets $edge_{curr}=edge_j$ (1616).

The system determines whether j is equal to nEdges−1 (1618).

When j is equal to nEdges−1 at 1618, the system sets $edge_{next}=edge_0$ (1620).

When j is not equal to nEdges−1 at 1618, the system sets $edge_{next}=edge_{j+1}$ (1622).

The system computes edge tangents (1624). This can include computing $edge_{curr}$ tangent $t_{curr}$ at the end vertex, and computing $edge_{next}$ tangent $t_{next}$ at the start vertex.

The system determines whether $t_{curr} \cdot t_{next} < \alpha$ (1626). α can be, for example, 0.6.

When $t_{curr} \cdot t_{next} < \alpha$ at 1626, the system increments j (j=j+1) (1628) and the process returns to 1614.

When $t_{curr} \cdot t_{next} \geq \alpha$ at 1626, the process terminates since the feature is a non-bead feature (1630).

A process such as that illustrated in FIG. 16 can be used with any bead feature, including the the traditional I-Bead (such as in FIG. 10A) and generic beads (such as in FIG. 10B). These can be meshed in its 2D flattened domain with a Delaunay mesh generator to create an "empty mesh" (mesh with no interior nodes).

Figure 17:
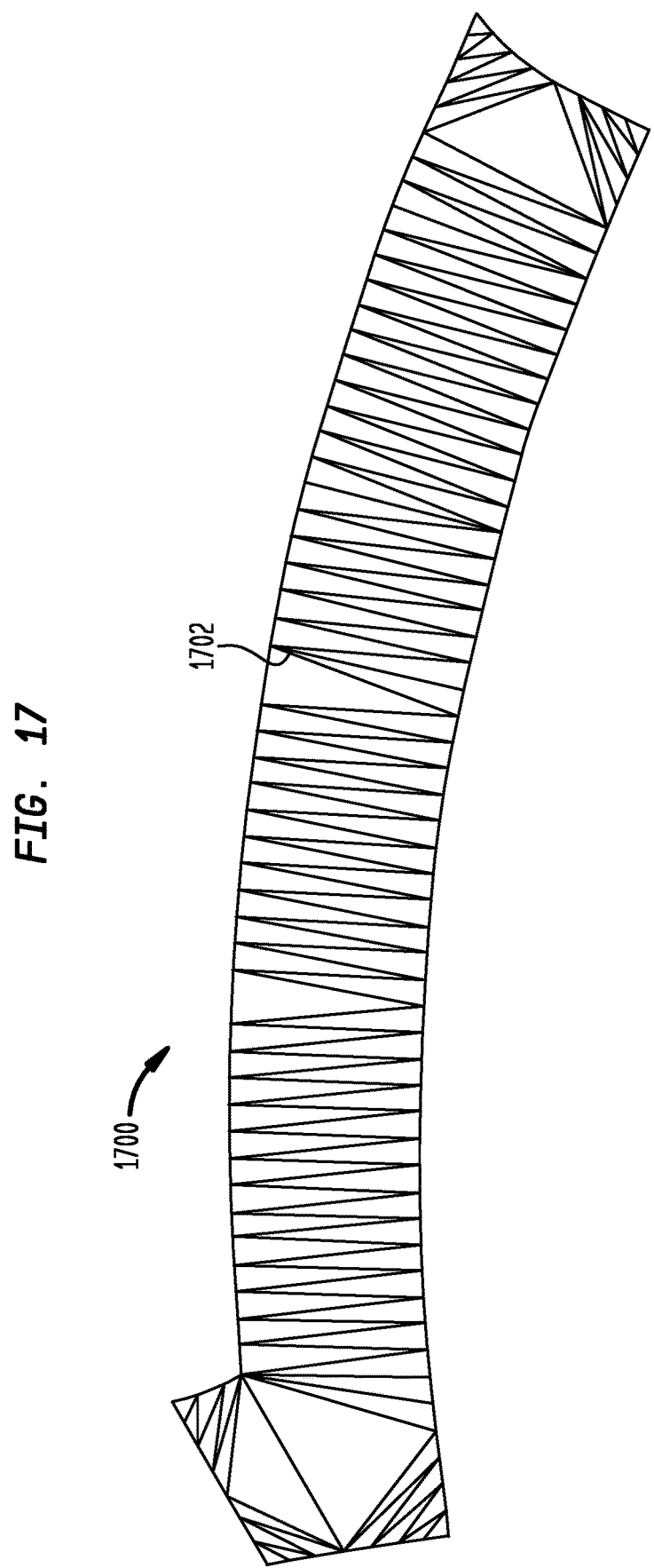
FIG. 17 illustrates a Delaunay mesh on a feature in accordance with disclosed embodiments.

FIG. 17 illustrates a Delaunay mesh 1702 on a feature 1700 in accordance with disclosed embodiments.

The system can then generate a truncated medial object representing the centerline of the feature for the bead shape based on the empty mesh, such as described in the patent publication incorporated above.

Figure 18:
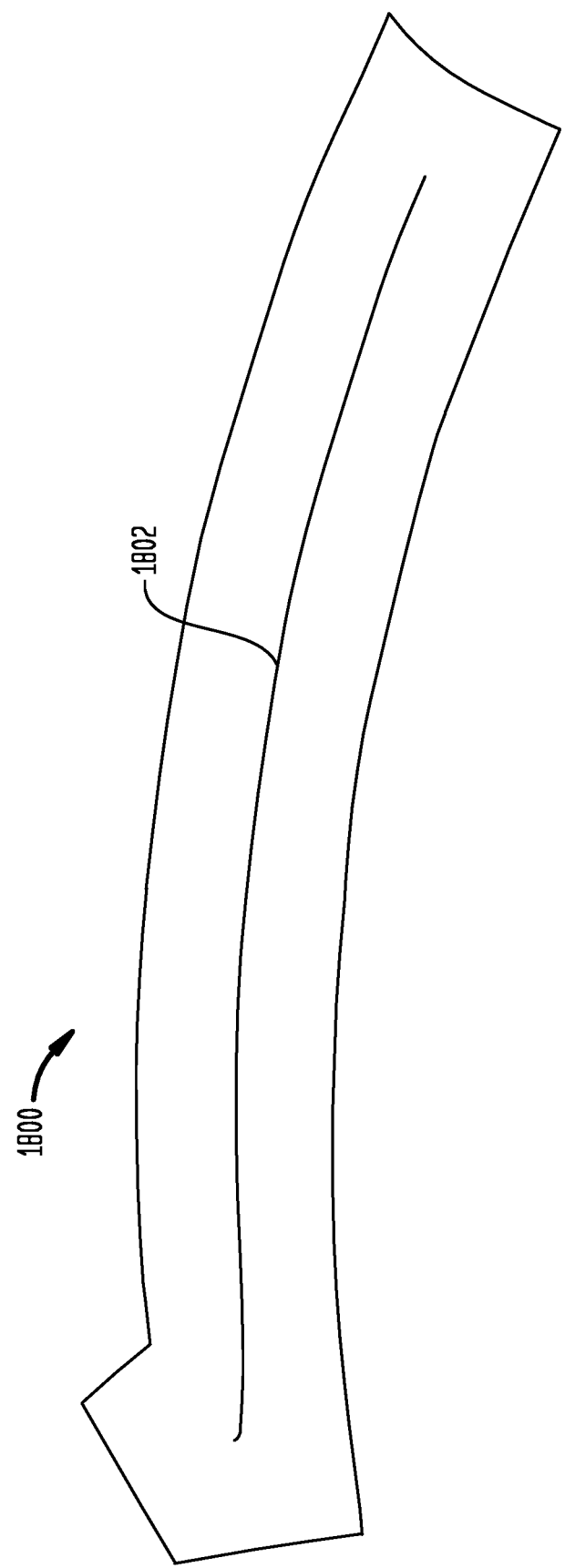
FIG. 18 illustrates a center or crestline of a feature in accordance with disclosed embodiments.

FIG. 18 illustrates a center or crestline 1802 of a feature 1800 in accordance with disclosed embodiments. Feature 1800 corresponds to feature 1700.

Disclosed embodiments can use the medial axis directly on to the face as an "implanted 2D feature line," which is not considered by any known processes. This implanted 2D feature line is premeshed/discretized with nodes to form a node-loop. This node-loop is added to the other node-loops of the face that represent its actual/real topology. The node-loops are joined using a loop-joining process as known to those of skill in the art. The joined node-loops become a single-loop that represents the meshing area. The final mesh is generated using known 2D mesh generation processes.

Figure 19:
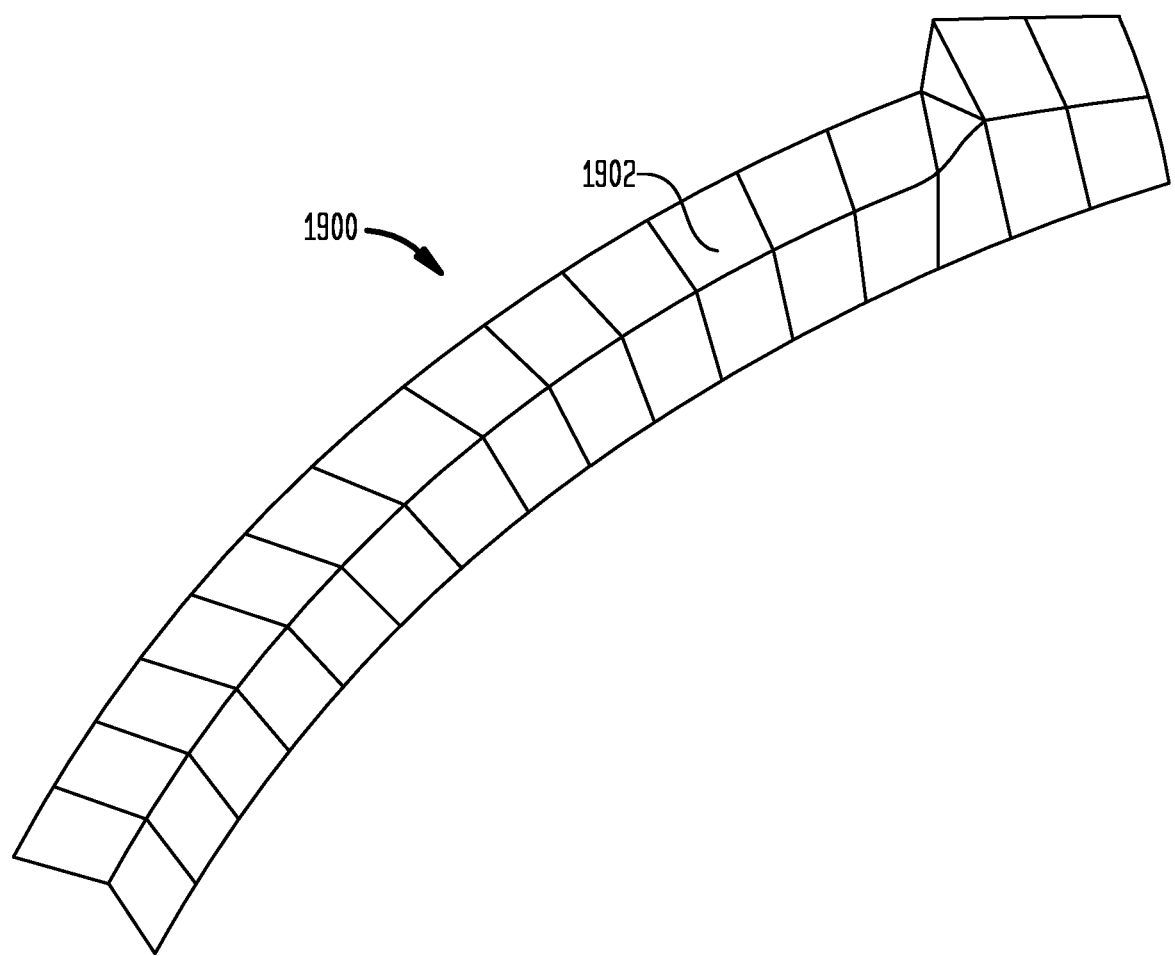
FIG. 19 illustrates a final mesh on a feature in accordance with disclosed embodiments.

FIG. 19 illustrates a final mesh 1902 on a feature 1900 in accordance with disclosed embodiments. A mesh as produced using disclosed processes are significantly improved over known techniques, including on the basis of tracing and honoring of the feature centerline. This provides a significant advantage in analysis driven design.

The system can process generic and non-map-meshable fillets. The fillet feature is also like a bead with the difference that it is generally four-sided and thus an ideal candidate for a mapped-mesh. However, not all fillets are map-meshable, as illustrated in FIG. 17.

Such faces may not have four unique vertices or are not mathematically four-sided. The fillet centerline is generated and implanted into the face as a 2D feature line the exact same way as for the generic bead in the item described above.

Figure 20:
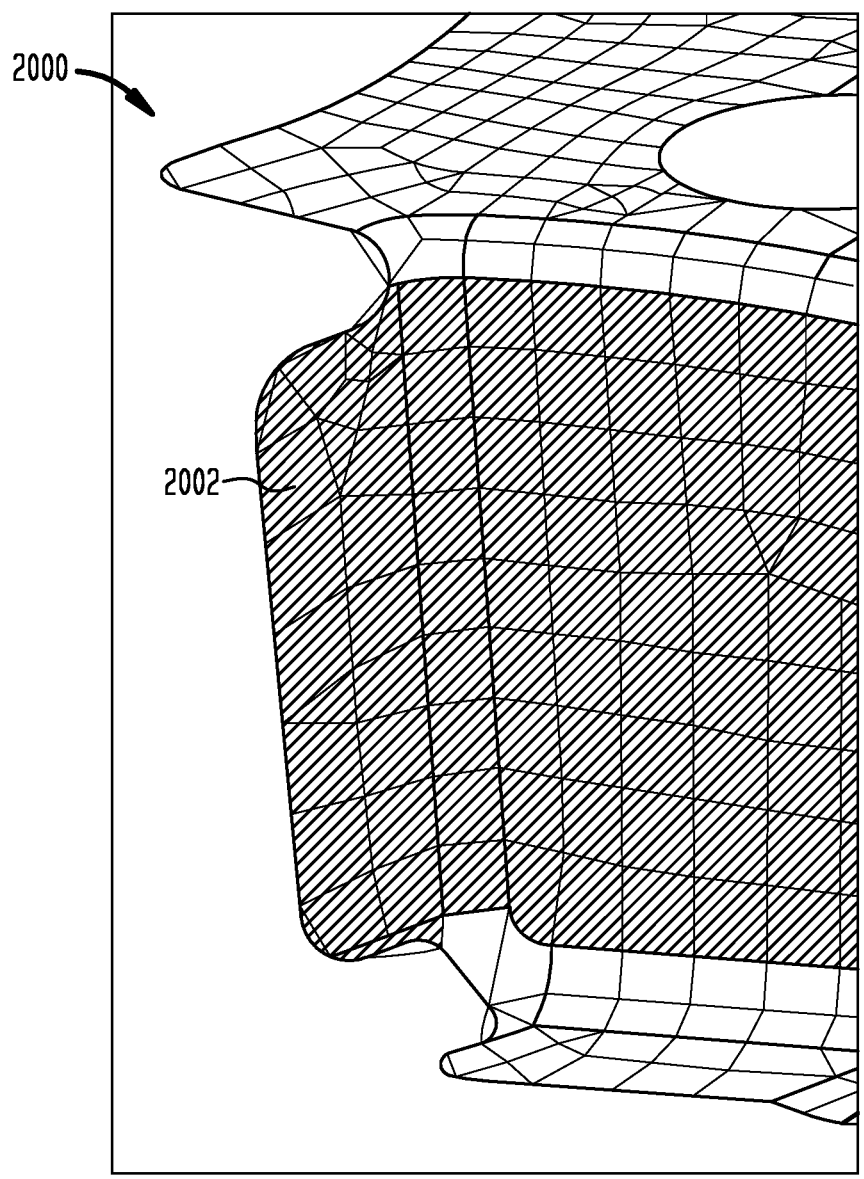
FIGS. 20-23 illustrate examples of fillet meshes in accordance with disclosed embodiments.

FIG. 20 illustrates an example of such a fillet mesh 2002 on a model 2000. It is to be noted that although the fillet in question is not four-sided the mesh generated on it is structured to the point of a quasi-mapped mesh. At other times traditional four-sided fillets cannot be map-meshed because of constraints coming from neighboring faces, as in FIGS. 20 and 22. In the example of FIG. 20, the fillet mesh is not getting two elements through thickness.

Figure 21:
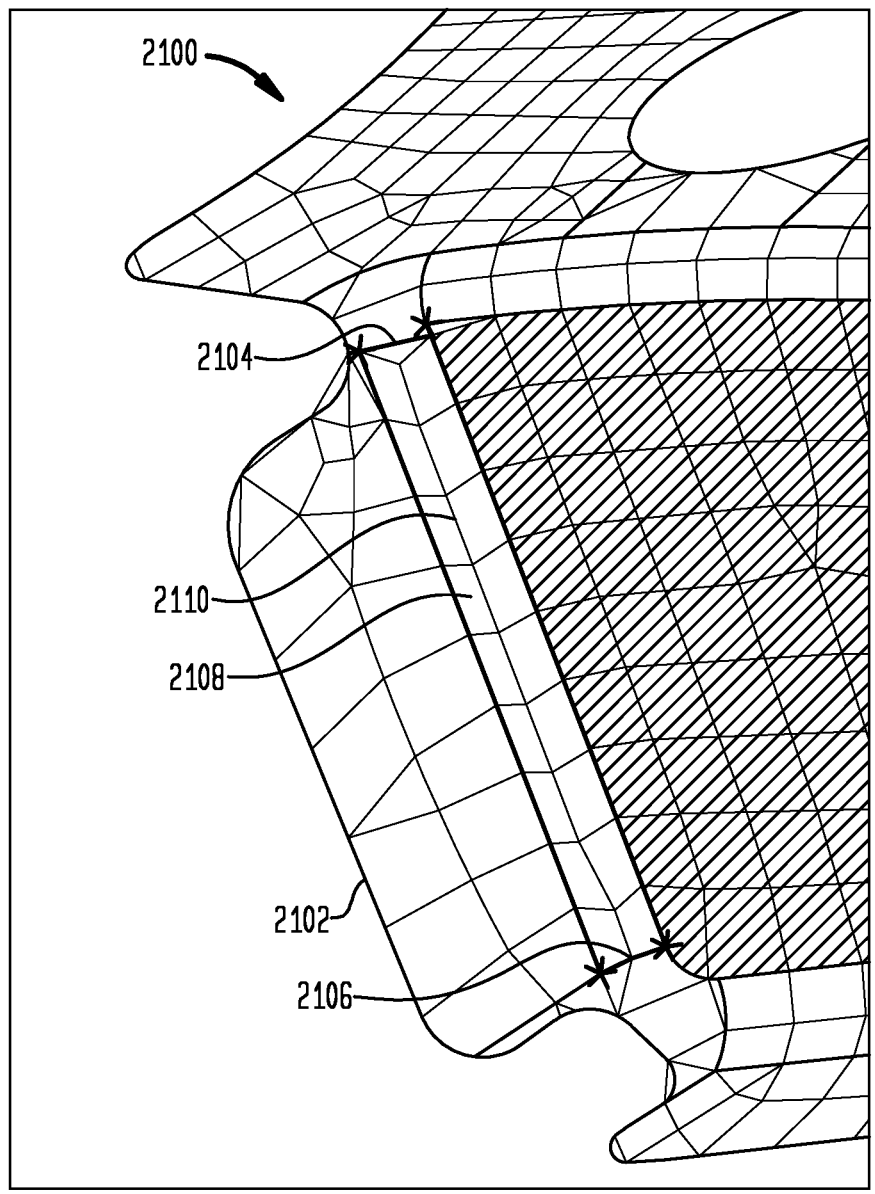

FIG. 21 illustrates an example of such a fillet mesh 2102 on a model 2100. In the example of FIG. 21, two elements 2104 and 2106 come through the thickness. Element 2104 is a single element count (mesh division) at the end of the emphasized face 2108. Element 2106 has two element counts or mesh divisions. The opposite sides of a face, such as face 2108, must have equal element counts for a face to map-mesh. That is on the case in face 2108, yet face 2108 has the "look and feel" of a map-mesh or structured mesh. This is because ridge line 2110 using a medial axis technique was inserted in the mesh.

Figure 22:
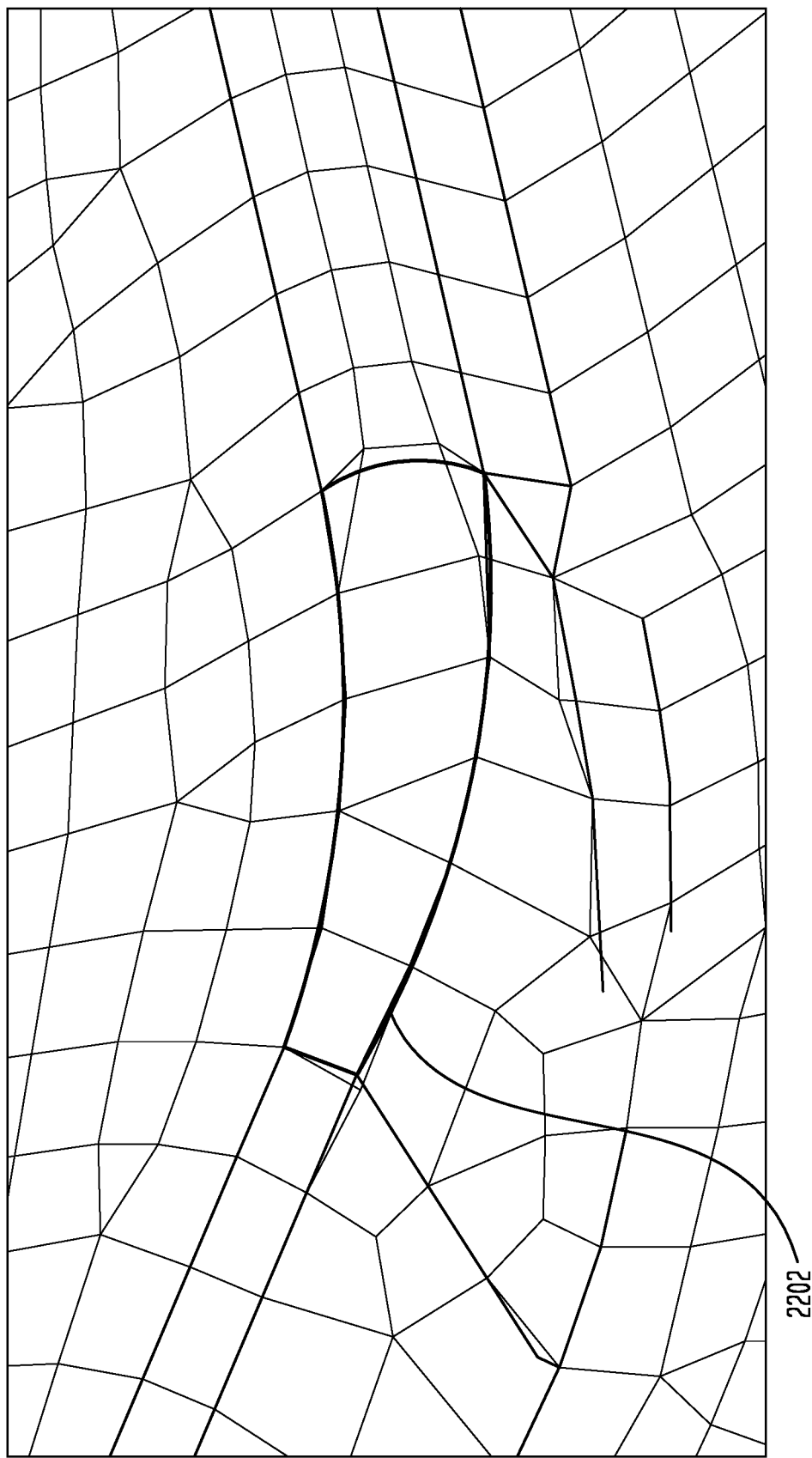

FIG. 22 illustrates an example of such a fillet mesh 2202 on a model 2200. In the example of FIG. 22, the fillet mesh is not getting two elements through thickness.

Figure 23:
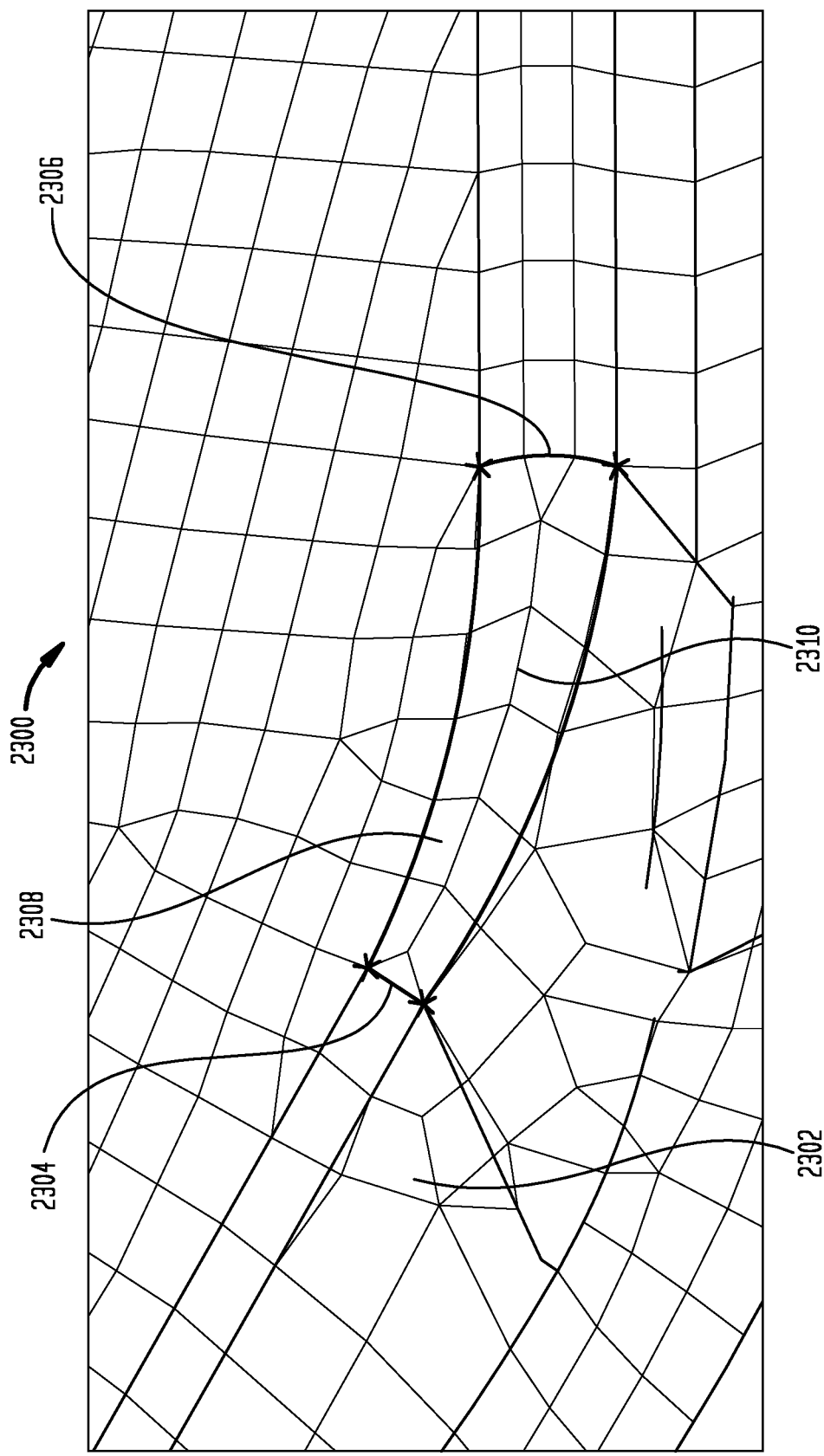

FIG. 23 illustrates an example of such a fillet mesh 2302 on a model 2300. In the example of FIG. 23, two elements 2304 and 2306 come through the thickness. Element 2304 is a single element count (mesh division) at the end of the emphasized face 2308. Element 2306 has three element counts or mesh divisions. The opposite sides of a face, such as face 2308, must have equal element counts for a face to accurately map-mesh. That is on the case in face 2308, yet face 2108 has the "look and feel" of a map-mesh or structured mesh. This is because ridge line 2310 using a medial axis technique was inserted in the mesh and the mesh is adapted to the ridge line 2310.

As illustrated, in fillets, ridge lines can be inserted to produce an unstructured mesh that is dominantly structured.

By inserting a feature centerline as described above the unstructured mesh on these fillets get the appearance of a quasi-mapped mesh and more importantly get two elements through the thickness of the feature (as shown in FIGS. 21 and 23) which is a mandatory analysis requirement for features.

The system can process local depressions. Local depressions are regions of products or other articles of manufacture for which spotweld applications are particularly appropriate. These depressions have a flat surface with medium to high curvature surfaces around them. The system and mesher process identifies them as clusters of fillets with flat regions on them and applies fillet meshing definitions on the curved portions and global mesh definitions on the flat faces.

Figure 24A:
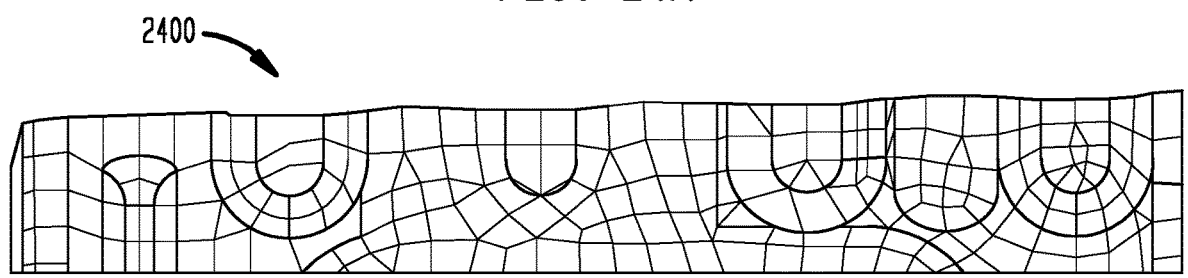
FIG. 24A illustrates a local depression area without using feature line preservation as disclosed herein.
Figure 24B:
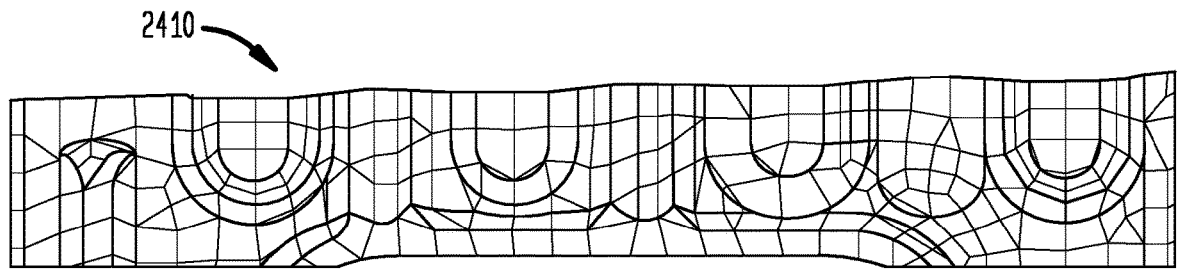
FIG. 24B illustrates a local depression area using feature line preservation as disclosed herein.

FIG. 24A illustrates a local depression area in a model 2400 of a part to be manufactured meshed without using feature line preservation as disclosed herein. FIG. 24B illustrates a local depression area in a model 2410 of a part to be manufactured meshed using feature line preservation as disclosed herein.

The system can processes flanges. Flanges are also parts of a carbody panel near the free boundary which are idea sites for spotweld application. A flange face is defined in the mesher as follows:

Face must be flat (not fillet, bead, cylindrical, annuli, circular)

Face must have some free edges as part of their outer faceloop.

The hydraulic diameter (Area/Perimeter) of the face, representing face width, must be less than 3 times the global element size.

Figure 25A:
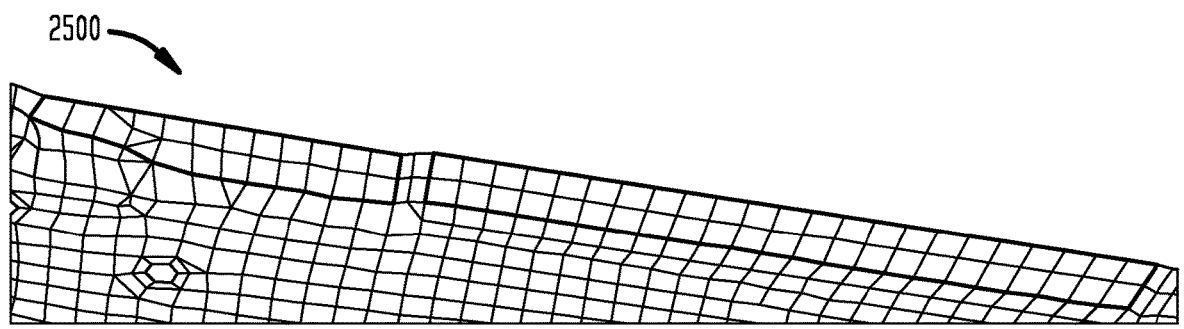
FIG. 25A illustrates a map-meshable flange with a default mesh in accordance with disclosed embodiments.
Figure 25B:
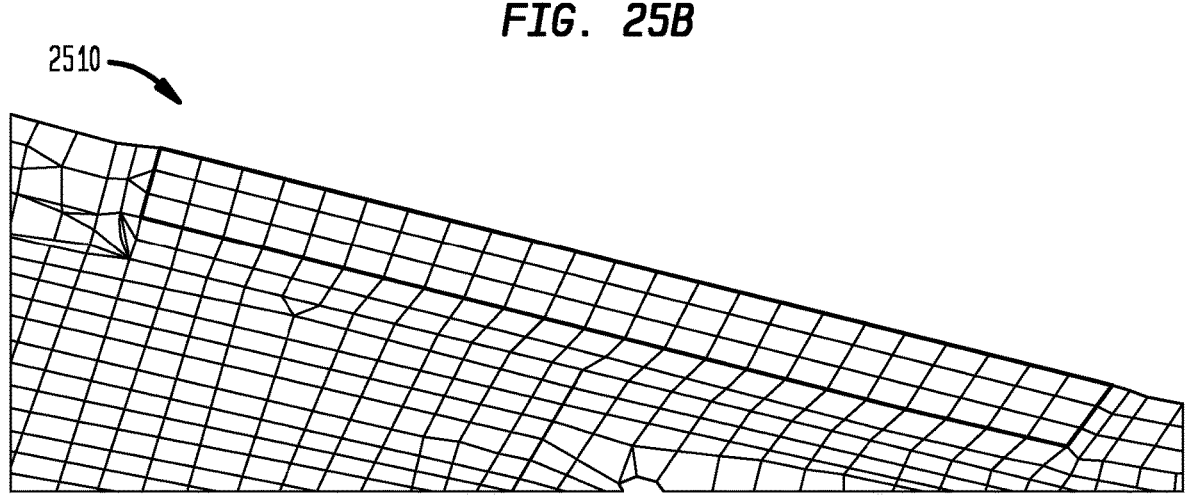
FIG. 25B illustrates a mesh generated with a flange definition in accordance with disclosed embodiments.

Once the system identifies a mesh, the flange is meshed in two ways. First, if the flange is four-sided and map-meshable, it is map-meshed with a global size driving the element count along the length and a count of three or more on the shorter pair of sides. FIG. 25A illustrates a map-meshable flange with a default mesh in a model 2500 of a part to be manufactured. FIG. 25B illustrates a mesh generated with a flange definition producing at least three rows of elements, in a model 2510 of a part to be manufactured.

For the non-map meshable faces, a "flange-definition" can be applied on the face. This is used to create two layers of paved mesh on the free edges of the flange face. The thickness of each layer is given by average thickness $t_a$. The paved mesh is dropped off after the second layer. The free mesher fills up the remaining portion of the flange.

Figure 26A:
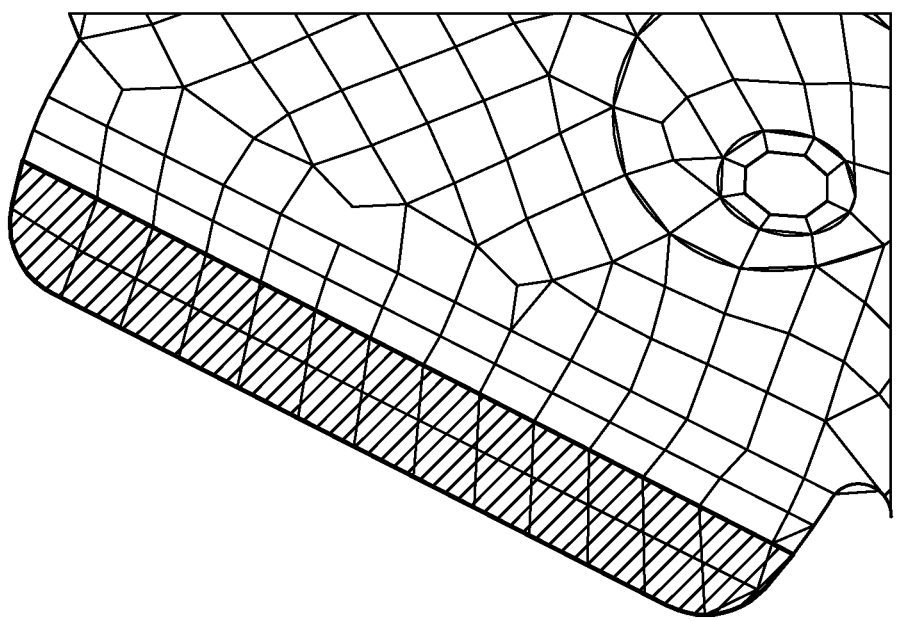
FIG. 26A illustrates a non-map-meshable flange with a default unpaved mesh in accordance with disclosed embodiments.
Figure 26B:
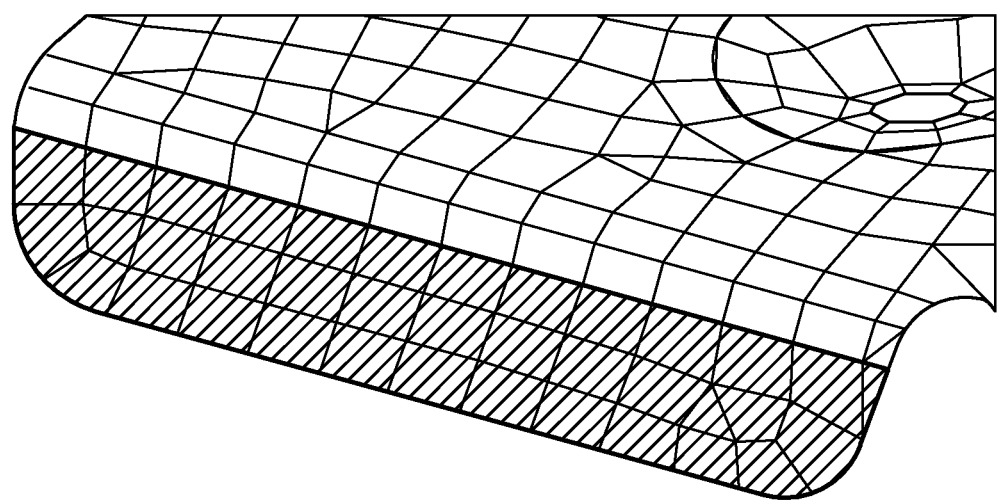
FIG. 26B illustrates a specially treated (paved) mesh with a flange definition in accordance with disclosed embodiments.

FIG. 26A illustrates a non-map-meshable flange with a default unpaved mesh in a model 2600 of a part to be manufactured. FIG. 26B illustrates a specially treated (paved) mesh with a flange definition producing at least 3 rows of elements, in a model 2610 of a part to be manufactured.

Disclosed processes provide an improved the curvature abstraction process and system so the resulting mesh not only meets industry specified quality characteristics but also represents the pertinent features of the model.

Figure 27A:
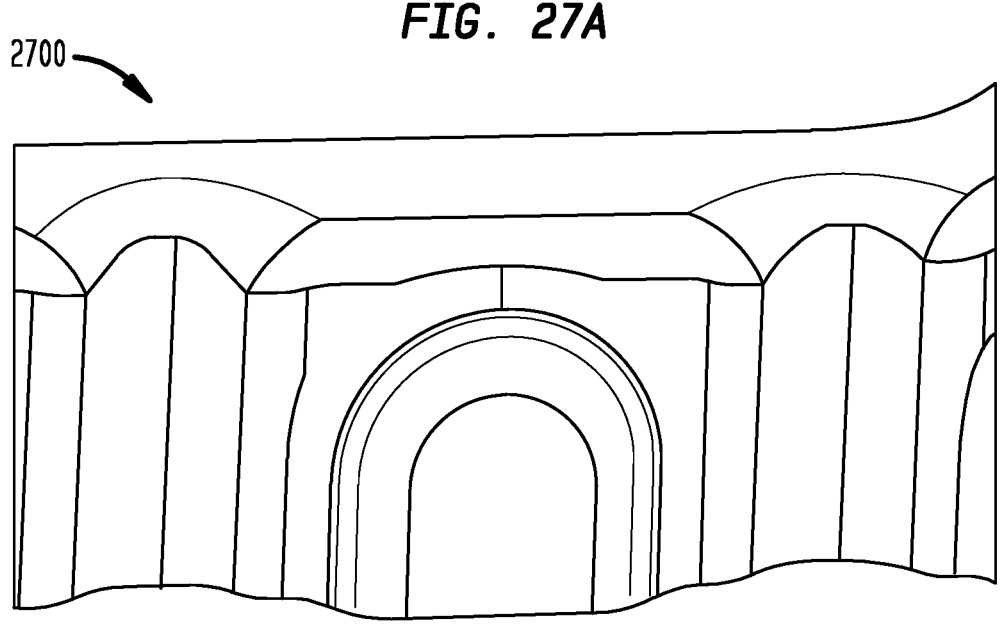
FIG. 27A illustrates a modified abstracted geometry in a high curvature zone in accordance with disclosed embodiments.
Figure 27B:
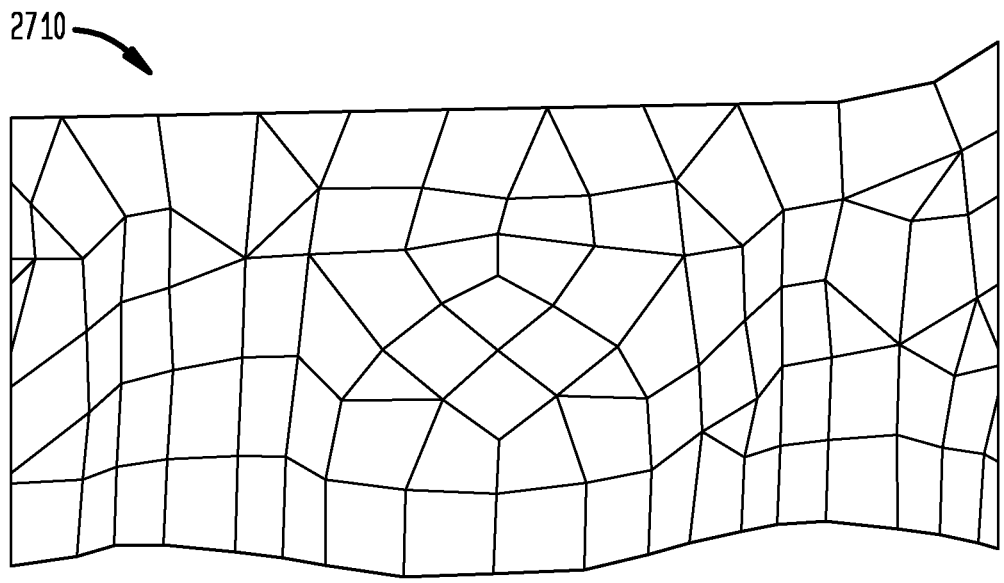
FIG. 27B illustrates a mesh on in accordance with disclosed embodiments.

FIG. 27A illustrates a modified abstracted geometry in a high curvature zone of model 2700 capturing pertinent features in accordance with disclosed embodiments, corresponding to and contrasting with the illustration of FIG. 9A. FIG. 27B illustrates a mesh on the abstracted geometry of FIG. 27A of model 2710 in accordance with disclosed embodiments, corresponding to and contrasting with the illustration of FIG. 9B. As can be seen, from a stress analysis point of view, the stiffness represented by the mesh in FIG. 27B is far more representative of the part to be manufactured as compared to FIG. 9B.

Disclosed processes improve the functioning of the system in producing accurate meshes, including but not limited to meshing processes for features like the generic bead, non-map-meshable fillet, local depression and flanges as described herein. Disclosed processes are "intelligent" in their auto-recognition ability and unique in their meshing strategies. Disclosed embodiments can combine different tools and techniques to create such meshes, including a 2D constrained Delaunay mesher, medial object technology, node-line generation, surgical insertion of node-line crest lines in the 2D mesh domain of the face, transfinite meshing, controlled partial loop-paving, etc.

Disclosed techniques are not template-based and thus can be applied to a large variety of geometries and mesh sizes irrespective of the industrial application. Whenever such geometries present themselves, the disclosed abstraction and meshing algorithms invented will handle them based on their shapes, sizes, topology, curvatures and meshing size in the same way. This makes these disclosed processes application-independent. Disclosed embodiments can offer a great deal of user control through a 2D meshing user interface and mesh control dialogs. Disclosed processes enable fully automatic feature recognition, abstraction, and meshing with improved, more accurate results than other processes.

According to various embodiments, the system can group abstracted surfaces are grouped into three categories based on curvature. In various embodiments, bead and fillet features from the high curvature group are identified. For all other surfaces in this group, the component surfaces are resurrected and common edges are checked for G2 discontinuity. These edges are preserved and the connected faces are reabstracted. Disclosed embodiments can use feature-sensitive meshing processes on all identified feature faces, using different strategies for different features.

Figure 28:
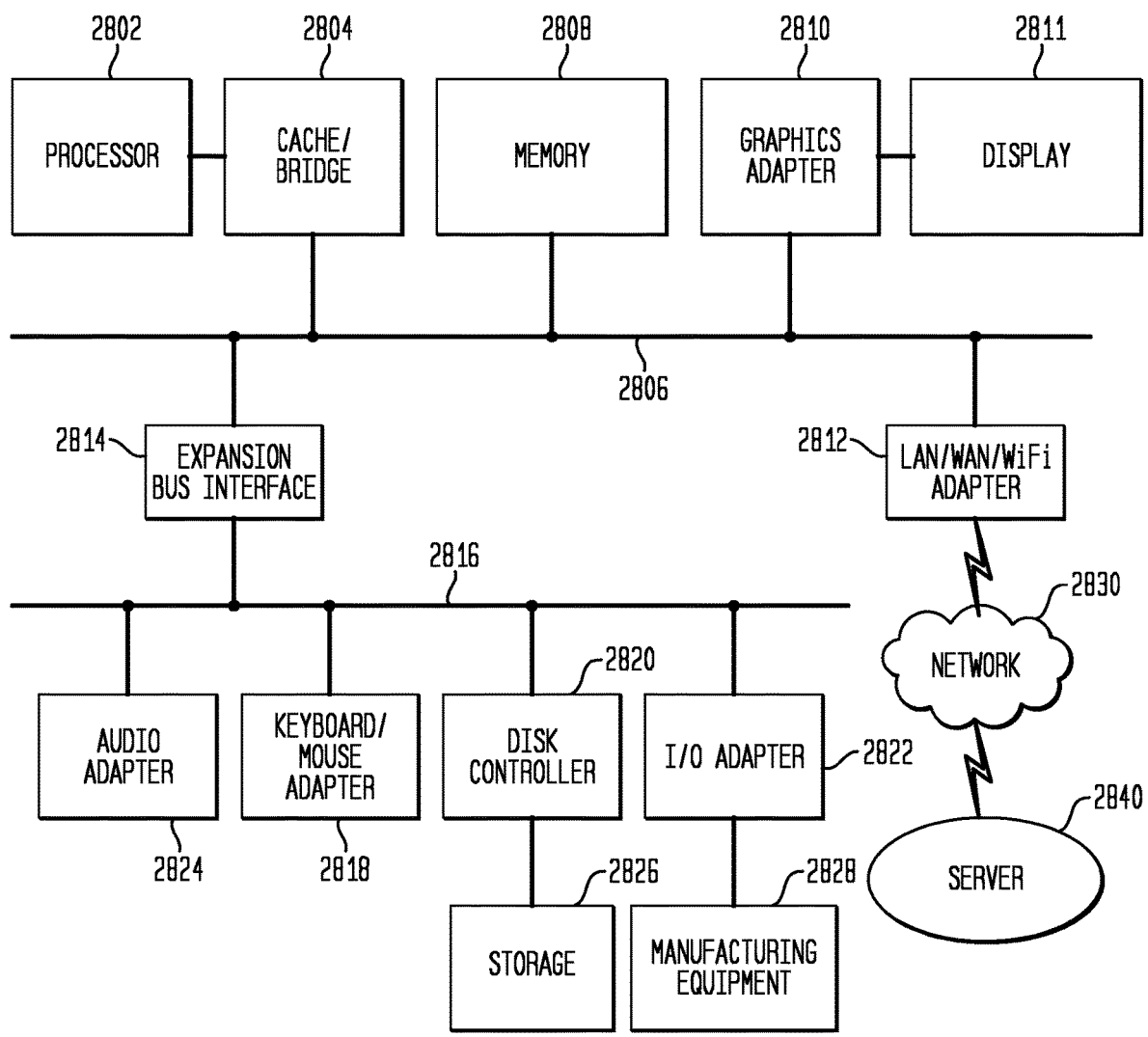
FIG. 28 illustrates a block diagram of a data processing system in which an embodiment can be implemented.

FIG. 28 illustrates a block diagram of a data processing system in which an embodiment can be implemented, for example as a CAD or PDM system particularly configured by software or otherwise to perform the processes as described herein, and in particular as each one of a plurality of interconnected and communicating systems as described herein. The data processing system depicted includes a processor 2802 connected to a level two cache/bridge 2804, which is connected in turn to a local system bus 2806. Local system bus 2806 may be, for example, a peripheral component interconnect (PCI) architecture bus. Also connected to local system bus in the depicted example are a main memory 2808 and a graphics adapter 2810. The graphics adapter 2810 may be connected to display 2811.

Other peripherals, such as local area network (LAN)/ Wide Area Network/Wireless (e.g. Wi-Fi) adapter 2812, may also be connected to local system bus 2806. Expansion bus interface 2814 connects local system bus 2806 to input/ output (I/O) bus 2816. I/O bus 2816 is connected to keyboard/mouse adapter 2818, disk controller 2820, and I/O adapter 2822. Disk controller 2820 can be connected to a storage 2826, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 2816 in the example shown is audio adapter 2824, to which speakers (not shown) may be connected for playing sounds. Keyboard/mouse adapter 2818 provides a connection for a pointing device (not shown), such as a mouse, trackball, track pointer, touchscreen, etc. I/O bus 2816 can also be connected to manufacturing equipment 2828 either direct or via I/O adapter 2822 for manufacturing parts according to the processes disclosed herein.

Those of ordinary skill in the art will appreciate that the hardware depicted in FIG. 28 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 2812 can be connected to a network 2830 (not a part of data processing system 2800), which can be any public or private data processing system network or combination of networks, as known to those of skill in the art, including the Internet. Data processing system 2800 can communicate over network 2830 with server system 2840, which is also not part of data processing system 2800, but can be implemented, for example, as a separate data processing system 2800.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 2100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Various publications describe techniques related to those disclosed herein, including the following, each of which is hereby incorporated by reference:

J. Makem and N. Mukherjee, 'Mesh generation system and method', patent application, WO2017040006A1, Mar. 9, 2017.

J. Makem, C. Armstrong and T. Robinson. Automatic decomposition and efficient semi-structured meshing of complex solids. Engineering with Computers. Pp 345-361, Springer, 2014.

D. Wang, B. Clark, X. Jiao, An analysis and comparison of parameterization-based computation of differential quantities for discrete surfaces, Comput. Aided Geom. Des. 26 (5) (2009) 510-527. doi:10.10164 cagd.2009.02.006.

G. Taubin, Estimating the tensor of curvature of a surface from a polyhedral approximation. Conference: Computer Vision, 1995. Proceedings., Fifth International. doi: 10.1109/ICCV.1995.466840

N. Mukherjee, 'CSALF-Q: A Bricolage Algorithm for Anisotropic Quad Mesh Generation', Proc. XXth International Meshing Roundtable, Paris, France, pp. 489-510, Springer, 2011.

J. Cabello, 'Toward Quality Surface Meshing', Proc. XIIth International Meshing Roundtable, Santa Fe, N. Mex., pp. 201-213, (2003).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method comprising:
    receiving a model of a part to be manufactured, wherein the model includes a plurality of original faces;
    classifying each face in the model according to a relative face curvature according to classifications that include at least a high-curvature classification;
    identifying sliver faces and narrow blend faces from the plurality of original faces, wherein a sliver face is a face whose area to perimeter ratio is below a first specified threshold, and wherein a narrow blend face is a face that is a sliver face at more than two times a specified minimum element size and is characterized by unidirectional or bidirectional curvature;
    classifying any sliver faces and narrow blend faces of the plurality of original faces into zones based on faces surrounding the sliver faces and the narrow blend faces;
    merging contiguous faces in each of the zones;
    detecting special faces, wherein the special faces are faces that are four-sided fillets, beads, annuli, circular faces, locally narrow faces, narrow blend faces, sliver faces, or any combination thereof;
    restoring original faces in the high-curvature classification except for the special faces;
    processing shared edges of the restored original faces to produce merged faces;
    merging together any merged faces that produce a locally narrow face or an isthmus face, wherein an isthmus face is a face having a narrow area below a second specified threshold, and wherein a locally narrow face is a face that is not as thin as a sliver face nor has an isthmus, but has a narrow tail; and
    storing a modified model of the part to be manufactured.

2. The method of claim 1, wherein processing the shared edges of the restored original faces to produce merged faces does not include merging shared edges that are G2 discontinuous.

3. The method of claim 1, wherein processing the shared edges of the restored original faces to produce merged faces does not include merging shared edges that are shared by a sliver face or an isthmus face.

4. The method of claim 1, further comprising causing the part to be manufactured.

5. The method of claim 1, further comprising computing a maximum mean curvature of each face and a maximum curvature of all faces, and wherein the relative face curvature of each face is a ratio of the curvature of that face to the maximum curvature of all faces.

6. The method of claim 1, wherein the classifications include the high-curvature classification, a medium-curvature classification, and a low-curvature classification.

7. The method of claim 1, further comprising performing a process for identifying geometric discontinuous edges in the model.

8. The method of claim 1, further comprising performing a feature abstraction process on the model.

9. The method of claim 1, further comprising performing a feature identification process for generic beads in the model.

10. A system comprising:
    a processor; and
    a non-transitory computer-readable medium storing instructions that, when executed by the processor, cause a data processing system to:
    receive a model of a part to be manufactured, wherein the model includes a plurality of original faces;
    classify each face in the model according to a relative face curvature according to classifications that include at least a high-curvature classification;
    identify sliver faces and narrow blend faces from the plurality of original faces, wherein a sliver face is a face whose area to perimeter ratio is below a first specified threshold, and wherein a narrow blend face is a face that is a sliver face at more than two times a specified minimum element size and is characterized by unidirectional or bidirectional curvature;
    classify any sliver faces and narrow blend faces of the plurality of original faces into zones based on faces surrounding the sliver faces and the narrow blend faces;
    merge contiguous faces in each of the zones;
    detect special faces, wherein the special faces are faces that are four-sided fillets, beads, annuli, circular faces, locally narrow faces, narrow blend faces, sliver faces, or any combination thereof;
    restore original faces in the high-curvature classification except for the special faces;
    process shared edges of the restored original faces to produce merged faces;
    merge together any merged faces that produce a locally narrow face or an isthmus face, wherein an isthmus face is a face having a narrow area below a second specified threshold, and wherein a locally narrow face is a face that is not as thin as a sliver face nor has an isthmus, but has a narrow tail; and
    store a modified model of the part to be manufactured.

11. The system of claim 10, wherein the instructions cause the data processing system to process the shared edges of the restored original faces to produce merged faces without merging shared edges that are G2 discontinuous.

12. The system of claim 10, wherein the instructions further cause the data processing system to compute a maximum mean curvature of each face and a maximum curvature of all faces, and wherein the relative face curvature of each face is a ratio of the curvature of that face to the maximum curvature of all faces.

13. The system of claim 10, wherein the classifications include the high-curvature classification, a medium-curvature classification, and a low-curvature classification.

14. The system of claim 10, wherein the instructions further cause the data processing system to perform a process for identifying geometric discontinuous edges in the model.

15. A non-transitory computer-readable medium comprising instructions that, when executed by a processor, cause a computing system to:
    receive a model of a part to be manufactured, wherein the model includes a plurality of original faces;

classify each face in the model according to a relative face curvature according to classifications that include at least a high-curvature classification;

identify sliver faces and narrow blend faces from the plurality of original faces, wherein a sliver face is a face whose area to perimeter ratio is below a first specified threshold, and wherein a narrow blend face is a face that is a sliver face at more than two times a specified minimum element size and is characterized by unidirectional or bidirectional curvature;

classify any sliver faces and narrow blend faces of the plurality of original faces into zones based on faces surrounding the sliver faces and the narrow blend faces;

merge contiguous faces in each of the zones;

detect special faces, wherein the special faces are faces that are four-sided fillets, beads, annuli, circular faces, locally narrow faces, narrow blend faces, sliver faces, or any combination thereof;

restore original faces in the high-curvature classification except for the special faces;

process shared edges of the restored original faces to produce merged faces;

merge together any merged faces that produce a locally narrow face or an isthmus face, wherein an isthmus face is a face having a narrow area below a second specified threshold, and wherein a locally narrow face is a face that is not as thin as a sliver face nor has an isthmus, but has a narrow tail; and store a modified model of the part to be manufactured.

16. The non-transitory computer-readable medium of claim 15, wherein the instructions cause the computing system to process the shared edges of the restored original faces to produce merged faces without merging shared edges that are G2 discontinuous.

17. The non-transitory computer-readable medium of claim 15, wherein the instructions cause the computing system to process the shared edges of the restored original faces to produce merged faces without merging shared edges that are shared by a sliver face or an isthmus face.

18. The non-transitory computer-readable medium of claim 15, wherein the instructions further cause the computing system to perform a feature abstraction process on the model.

19. The non-transitory computer-readable medium of claim 15, wherein the instructions cause the computing system to perform a feature identification process for generic beads in the model.

* * * * *